US012732262B2

(12) United States Patent
Åström et al.

(10) Patent No.: US 12,732,262 B2
(45) Date of Patent: Sep. 8, 2026

(54) SIGNALING FOR SIMULTANEOUS OPERATION IN INTEGRATED ACCESS BACKHAUL (IAB) NODE

(71) Applicant: Telefonaktiebolaget LM Ericsson (publ), Stockholm (SE)

(72) Inventors: Magnus Åström, Lund (SE); Lei Bao, Gothenburg (SE); Behrooz Makki, Pixbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 18/553,887

(22) PCT Filed: Apr. 6, 2022

(86) PCT No.: PCT/EP2022/059078
§ 371 (c)(1),
(2) Date: Oct. 4, 2023

(87) PCT Pub. No.: WO2022/214528
PCT Pub. Date: Oct. 13, 2022

(65) Prior Publication Data

US 2024/0259084 A1 Aug. 1, 2024

Related U.S. Application Data

(60) Provisional application No. 63/171,486, filed on Apr. 6, 2021.

(51) Int. Cl.
*H04W 8/24* (2009.01)
*H04B 7/06* (2006.01)
(Continued)

(52) U.S. Cl.
CPC ....... *H04B 7/15528* (2013.01); *H04B 7/0697* (2013.01)

(58) Field of Classification Search
CPC .. H04B 7/15528; H04B 7/088; H04B 7/0697; H04B 7/15542; H04B 17/24;
(Continued)

(56) References Cited

U.S. PATENT DOCUMENTS 11,082,979 B2 8/2021 Seo et al.
11,303,349 B2 * 4/2022 Jo .................... H04W 72/0446
(Continued)

FOREIGN PATENT DOCUMENTS

CN 110278610 B 7/2022
EP 4096326 A1 11/2022
(Continued)

OTHER PUBLICATIONS

CEWIT: "Discussions on enhancements to resource multiplexing between child and parent links of an IAB node", 3GPP Draft; R1-2006329, vol. RAN WG1, No. e-Meeting; Aug. 17, 2020-Aug. 28, 2020 (Aug. 8, 2020).*
(Continued)

*Primary Examiner* — Edan Orgad
*Assistant Examiner* — Vanneilian Lalchinthang
(74) *Attorney, Agent, or Firm* — Murphy, Bilak & Homiller, PLLC

(57) ABSTRACT

Embodiments include methods for an integrated access backhaul (IAB) node serving a cell in a wireless network. The IAB node can include an IAB distributed unit (IAB-DU) and an IAB mobile terminal (IAB-MT). Such methods include sending, to an IAB donor centralized unit (CU) in the wireless network, an indication of one or more simultaneous operation capabilities of the IAB-DU and the IAB-MIT and receiving from the IAB donor CU a multiplexing configuration based on the simultaneous operation capabilities. Such methods also include configuring one or more of the following for operation in the cell according to the
(Continued)

received multiplexing configuration: one or more child IAB nodes; and one or more user equipment (UEs). Other embodiments include complementary methods for an IAB donor CU and a parent IAB node of the IAB node, as well as IAB nodes and IAB donor CUs configured to perform such methods.

22 Claims, 16 Drawing Sheets

(51) Int. Cl.
*H04B 7/155* (2006.01)
*H04W 72/20* (2023.01)

(58) Field of Classification Search
CPC .. H04B 17/336; H04B 17/345; H04B 7/0628; H04B 7/06952; H04W 24/10; H04W 72/046; H04W 72/0493; H04W 72/23; H04W 72/53; H04W 72/535; H04W 28/16; H04W 72/0446; H04W 84/047
USPC .......................................................... 370/315
See application file for complete search history.

(56) References Cited

U.S. PATENT DOCUMENTS

| | | | | |
|---|---|---|---|---|
| 12,267,813 | B2* | 4/2025 | Zhang | H04L 5/001 |
| 2020/0336890 | A1* | 10/2020 | Abedini | H04B 7/0697 |
| 2021/0100012 | A1 | 4/2021 | Miao | |
| 2021/0168852 | A1 | 6/2021 | Panteleev et al. | |
| 2021/0243782 | A1 | 8/2021 | Miao | |
| 2021/0289421 | A1 | 9/2021 | Akl et al. | |
| 2021/0368360 | A1 | 11/2021 | Akl et al. | |
| 2021/0368481 | A1* | 11/2021 | Jo | H04W 72/21 |
| 2022/0217661 | A1* | 7/2022 | Yokomakura | H04B 7/155 |
| 2022/0287123 | A1 | 9/2022 | Tiirola et al. | |
| 2022/0361174 | A1* | 11/2022 | Liu | H04L 27/2605 |
| 2023/0108413 | A1 | 4/2023 | You et al. | |
| 2023/0117298 | A1 | 4/2023 | Park et al. | |
| 2023/0164747 | A1* | 5/2023 | You | H04W 72/23 370/329 |
| 2023/0164793 | A1* | 5/2023 | Ghanbarinejad | H04L 5/0053 370/329 |
| 2023/0345553 | A1 | 10/2023 | Maya et al. | |
| 2023/0412250 | A1* | 12/2023 | Huang | H04L 5/0055 |

FOREIGN PATENT DOCUMENTS

| | | | |
|---|---|---|---|
| EP | 4117387 | A1 | 1/2023 |
| WO | 2017014572 | A1 | 1/2017 |
| WO | 2018143702 | A1 | 8/2018 |
| WO | 2020010613 | A1 | 1/2020 |
| WO | 2020032578 | A1 | 2/2020 |
| WO | 2020145358 | A1 | 7/2020 |
| WO | 2020239042 | A1 | 12/2020 |
| WO | 2021028785 | A1 | 2/2021 |
| WO | 2021178788 | A1 | 9/2021 |
| WO | 2021205343 | A1 | 10/2021 |
| WO | 2022084301 | A1 | 4/2022 |
| WO | 2022214528 | A1 | 10/2022 |

OTHER PUBLICATIONS

"3GPP TS 29.281 V15.6.0", 3rd Generation Partnership Project; Technical Specification Group Core Network and Terminals; General Packet Radio System (GPRS) Tunnelling Protocol User Plane (GTPv1-U) (Release 15), Sep. 2019, pp. 1-32.
"3GPP TS 38.331 V16.4.0", 3rd Generation Partnership Project; Technical Specification Group Radio Access Network; NR; Radio Resource Control (RRC) protocol specification (Release 16), Mar. 2021, pp. 1-949.
"3GPP TS 38.425 V15.6.0", 3rd Generation Partnership Project; Technical Specification Group Radio Access Network; NG-RAN; NR user plane protocol (Release 15), Jul. 2019, pp. 1-22.
"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.
"Discussions on enhancements to resource multiplexing between child and parent links of an IAB node", 3GPP TSG RAN WG 1 Meeting #102-e, R1-2006329, e-Meeting, Aug. 17-28, 2020, pp. 1-7.
"New WID on Enhancements to Integrated Access and Backhaul", 3GPP TSG RAN Meeting #88e, RP-201293, Electronic Meeting, (revision of RP-193251), Jun. 29-Jul. 3, 2020, pp. 1-5.
"Resource multiplexing and DC in enhanced IAB", 3GPP TSG-RAN WG1 Meeting #104-bis-e, R1-2103712, eMeeting, Apr. 12-20, 2021, pp. 1-15.
"Resource multiplexing and DC in enhanced IAB", 3GPP TSG-RAN WG1 Meeting #104-e, R1-2101695, eMeeting, Jan. 25-Feb. 5, 2021, pp. 1-14.
"Resource multiplexing and DC in enhanced IAB", 3GPP TSG-RAN WGI Meeting #105-e; Online, R1-2105852, May 10-27, 2021, pp. 1-17.
"Resource multiplexing and dual connectivity in enhanced IAB", 3GPP TSG-RAN WG1 Meeting #106-e, R1-2108107, Online, Aug. 16-27, 2021, pp. 1-20.
"Resource multiplexing and dual connectivity in enhanced IAB", 3GPP TSG-RAN WG1 Meeting #106bis-e, R1-2110331, Online, Oct. 11-19, 2021, pp. 1-20.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TS 38.473 V15.6.0", 3rd Generation Partnership Project; Technical Specification Group Radio Access Network; NG-RAN; F1 application protocol (F1AP) (Release 15), Jul. 2019, pp. 1-220.
"3GPP TS 38.473 V16.4.0", 3rd Generation Partnership Project; Technical Specification Group Radio Access Network; NG-RAN; F1 application protocol (F1AP) (Release 16), Jan. 2021, pp. 1-461.
"3GPP TS 38.213 V16.5.0", 3rd Generation Partnership Project; Technical Specification Group Radio Access Network; NR; Physical layer procedures for control (Release 16), Mar. 2021, pp. 1-183.
"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.
"3GPP TR 38.874 V0.2.1", 3rd Generation Partnership Project; Technical Specification Group Radio Access Network; Study on Integrated Access and Backhaul; (Release 15), May 2018, pp. 1-19.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.
"3GPP TS 38.321 V15.2.0", 3rd Generation Partnership Project; Technical Specification Group Radio Access Network; NR; Medium Access Control (MAC) protocol specification (Release 15), Jun. 2018, pp. 1-73.
"3rd Generation Partnership Project; Technical Specification Group Radio Access Network; NR; Study on Integrated Access and Backhaul; (Release 16)", 3GPP TR 38.874 V16.0.0, Dec. 2018, pp. 1-111.
"CB:# 45_Email045-IAB_PHYlayer_param_F1 Ap", 3GPP TSG-RAN WG3 Meeting #107-e, R3-201144, Electronic Meeting, Feb. 24-Mar. 6, 2020, pp. 1-6.
"Corrections on integrated access and backhaul", 3GPP TSG-RAN WG1 Meeting #100-e, R1-2001452, e-Meeting, Feb. 24-Mar. 6, 2020, pp. 1-5.

(56) References Cited

OTHER PUBLICATIONS

"Discussion on IAB resource multiplexing enhancements", 3GPP TSG RAN WG1 Meeting #102-e, R1-2006361, e-Meeting, Aug. 17-28, 2020, pp. 1-8.
"Enhancement to resource multiplexing between child and parent links", 3GPP TSG RAN WG1 #104b-e, R1-2102538, e-Meeting, Apr. 12-20, 2021, pp. 1-8.
"IAB Resource Management Framework", 3GPP TSG RAN WG1 Meeting #96, R1-1902992, Athens, Greece, Feb. 25-Mar. 1, 2019, pp. 1-8.
"Mechanisms for resource coordination and radio-aware scheduling for IAB", 3GPP TSG RAN WG1 #96, R1-1901894, Athens, Greece, Feb. 25-Mar. 1, 2019, pp. 1-6.
"Mechanisms for resource multiplexing among backhaul and access links", 3GPP TSG RAN WG1 Meeting #98, R1-1908987, Prague, Czech Republic, Aug. 26-30, 2019, pp. 1-20.
"Remaining issues on IAB resource configuration and multiplexing", 3GPP TSG-RAN WG1 Meeting #99, R1-1912133, Reno, U.S., Nov. 18-22, 2019, pp. 1-5.
"Summary #2 of 7.2.3.3—Mechanisms for resource multiplexing among backhaul and access links", 3GPP TSG-RAN WG1 Meeting #100-e, R1-2001160, e-Meeting, Feb. 24-Mar. 6, 2020, pp. 1-19.
"3GPP Ts 38.473 V15.4.0", 3rd Generation Partnership Project; Technical Specification Group Radio Access Network; NG-RAN; F1 application protocol (F1AP) (Release 15), Dec. 2018, pp. 1-192.
"3rd Generation Partnership Project; Technical Specification Group Radio Access Network; NG-RAN; F1 application protocol (F1AP) (Release 16)", 3GPP TS 38.473 V16.6.0, Jul. 2021, pp. 1-463.
Qualcomm, "New WID on Enhancements to Integrated Access and Backhaul", 3GPP TSG RAN Meeting #86, RP-193251, (revision of RP-193145), Sitges, Spain, Dec. 9-12, 2019, pp. 1-5.

* cited by examiner

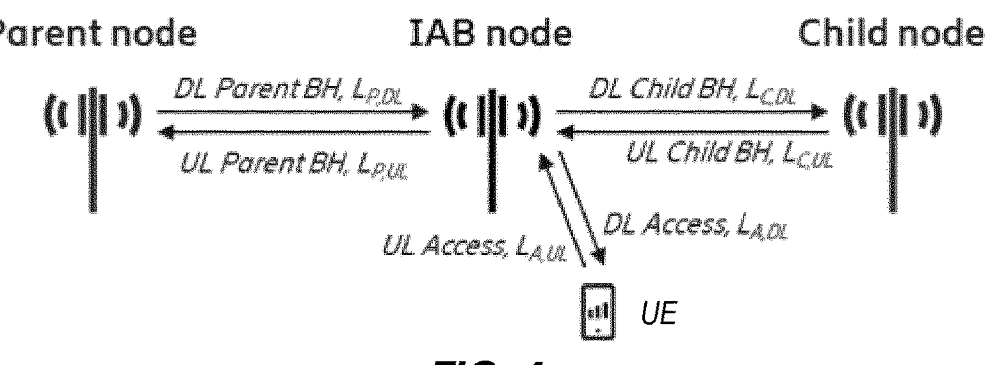
FIG. 4
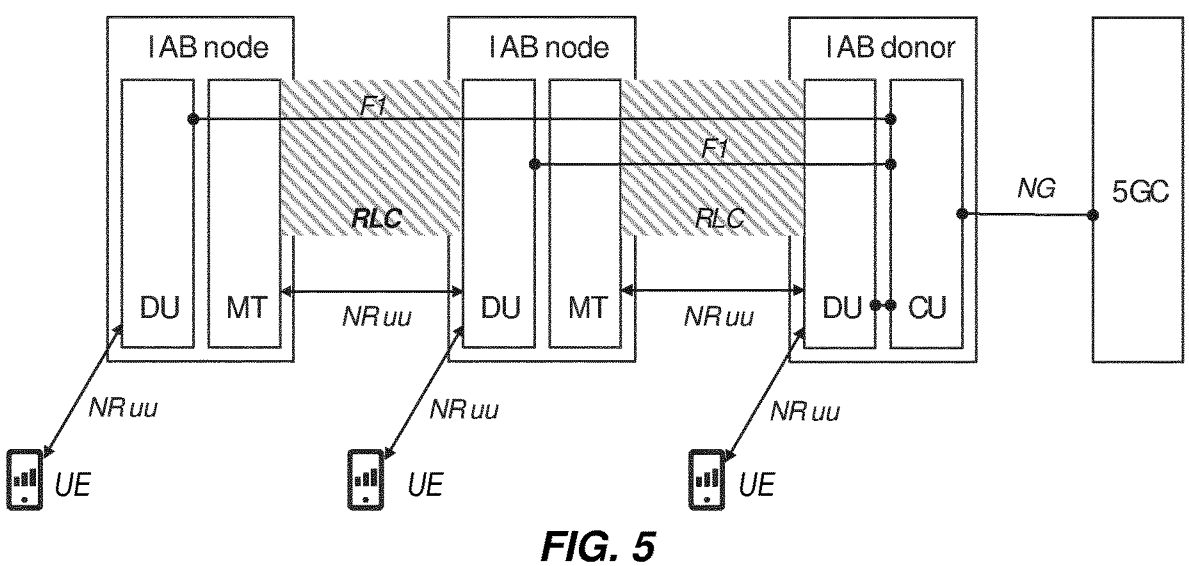
FIG. 5
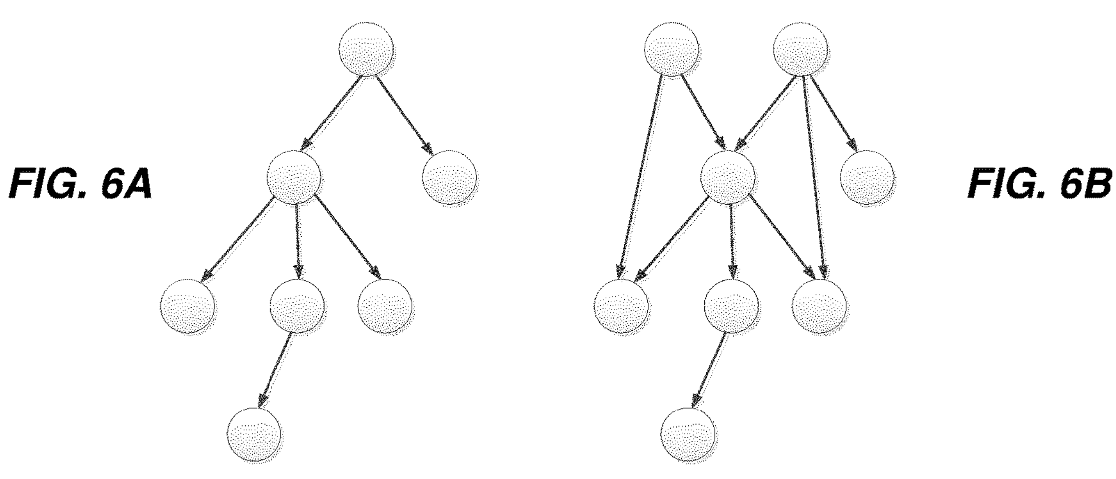

| | | MT configuration | | |
|---|---|---|---|---|
| | | DL | UL | Flexible |
| DU configuration | DL-H | DU: can transmit on DL unconditionally; MT: not available. | DU: can transmit on DL unconditionally; MT: not available. | DU: can transmit on DL unconditionally; MT: not available. |
| | DL-S | DU: can transmit conditionally; MT: available on DL. | DU: can transmit conditionally; MT: available on UL. | DU: can transmit conditionally; MT: available on DL & UL. |
| | UL-H | DU: can schedule UL unconditionally; MT: not available. | DU: can schedule UL unconditionally; MT: not available. | DU: can schedule UL unconditionally; MT: not available. |
| | UL-S | DU: can schedule UL conditionally; MT: available on DL. | DU: can schedule UL conditionally; MT: available on UL. | DU: can schedule UL conditionally; MT: available on DL & UL. |
| | F-H | DU: can transmit on DL or schedule UL unconditionally; MT: not available. | DU: can transmit on DL or schedule UL unconditionally; MT: not available. | DU: can transmit on DL or schedule UL unconditionally; MT: not available. |
| | F-S | DU: can transmit on DL or schedule UL conditionally; MT: available on DL. | DU: can transmit on DL or schedule UL conditionally; MT: available on UL. | DU: can transmit on DL or schedule UL conditionally; MT: available on DL & UL. |
| | NA | DU: not available; MT: available on DL. | DU: not available; MT: available on UL. | DU: not available; MT: available on DL & UL. |

*FIG. 8*

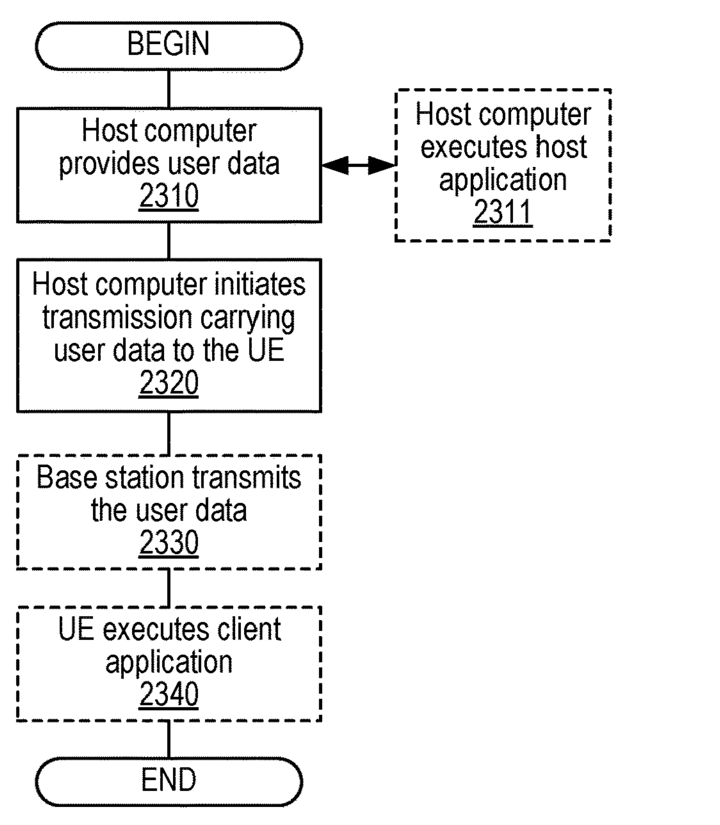
FIG. 23
BEGIN
Host computer provides user data 2410
Host computer initiates transmission carrying user data to the UE 2420
UE receives the user data 2430
END
FIG. 24
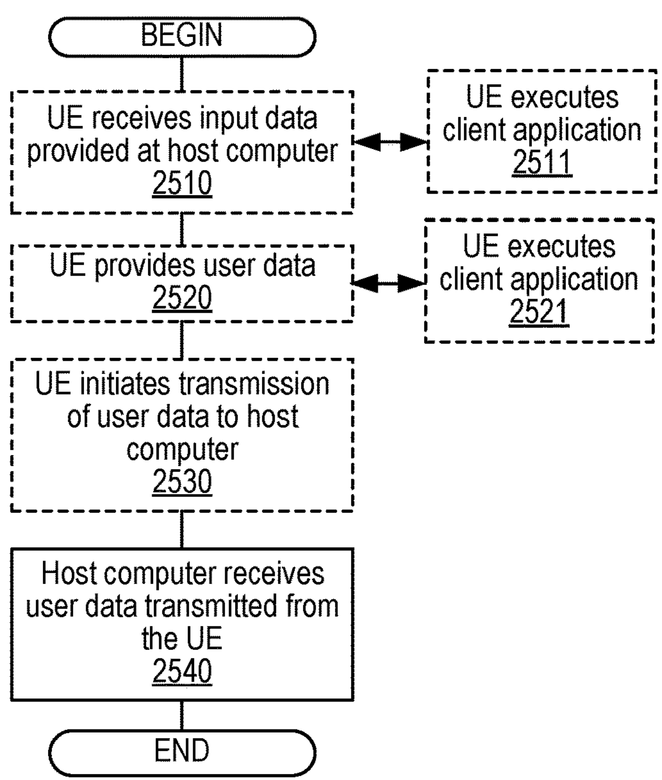
FIG. 25
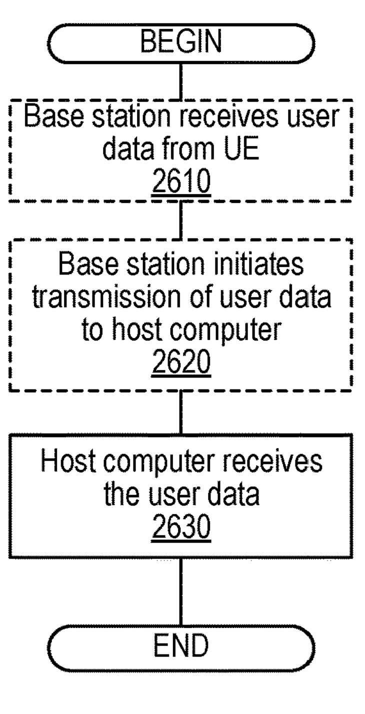
FIG. 26

SIGNALING FOR SIMULTANEOUS OPERATION IN INTEGRATED ACCESS BACKHAUL (IAB) NODE

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

INTRODUCTION

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, including Session Management Function(s) (SMF).

Although not shown, in some deployments 5GC 198 can be replaced by an Evolved Packet Core (EPC), which conventionally has been used together with a Long-Term Evolution (LTE) Evolved UMTS RAN (E-UTRAN). In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" with the term AMF being described in more detail below.

The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs are logical nodes that host higher-layer protocols and perform various gNB functions such controlling the operation of DUs, which are logical nodes that host lower layer protocols and can include various subsets of the gNB functions. As such, each of the CUS and DUs can include various circuitry needed to perform their respective functions, including processing circuitry, communication interface circuitry (e.g., transceivers), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Densification via the deployment of more and more base stations (e.g., macro or micro base stations) can be employed to satisfy the increasing demand for bandwidth and/or capacity in mobile networks, which is mainly driven by the increasing use of video streaming services. Due to the availability of more spectrum in the millimeter wave (mmW) band, deploying small cells that operate in this band is an attractive option. However, the normal approach of connecting small cells to the operator's backhaul network with optical fiber can be very expensive and impractical. 25 Employing wireless links for connecting the small cells to the operator's network is a cheaper and more practical alternative with less time-to-market.

One such approach is an integrated access backhaul (IAB) network where the operator can repurpose radio resources conventionally used for network access (e.g., by wireless devices or UEs) for use to connect small cells to the operator's backhaul network. IAB was studied earlier in 3GPP in the scope of LTE Rel-10. That work produced an architecture based on a Relay Node (RN) with the functionality of an LTE eNB and UE modem. The RN is connected to a donor eNB which has a S1/X2 proxy functionality hiding the RN from the rest of the network. That architecture enabled the Donor eNB to also be aware of the UEs behind the RN but hid any UE mobility between Donor eNB and connected RN(s) from the CN.

Similar IAB options can also be considered for 5G/NR networks. One difference compared to LTE is the gNB-CU/DU split architecture described above, which separates time critical RLC/MAC/PHY protocols from less time critical RRC/PDCP protocols. In general, the 3GPP NR IAB specifications reuse existing functions and interfaces defined in NR. Each IAB node can include the functionality of a gNB-DU (also referred to as "IAB-DU") that terminates the radio interface layers of access links towards served UEs and backhaul links towards immediately downstream (or "child") IAB nodes.

Each IAB node can also include a Mobile-Termination function (referred to as MT or "IAB-MT") that terminates the radio interface layers of a backhaul link towards an immediately upstream (or "parent") DU, i.e., either an IAB-DU or a donor gNB. MT is similar to functionality that enables UEs to access the IAB network and has been specified by 3GPP as part of the Mobile Equipment (ME). In addition to the connection to downstream IAB-MTs and/or UEs, each IAB-DU also has an upstream F1 connection to the CU part of a donor gNB, also referred to as an "IAB-donor CU". This connection is via a particular DU of the donor gNB, also referred to as an "IAB-donor DU". Each IAB-donor CU may be associated with multiple IAB-donor DUs.

IAB topology also allows one IAB node to connect to multiple parent nodes and/or to multiple child nodes. Currently, this functionality is used for back-up or redundancy purposes, e.g., in case of radio link failure of one parent node.

SUMMARY

It is desirable to use links to multiple parent and/or multiple child IAB nodes concurrently for load balancing, improved reliability, etc. One objective for NR Rel-17 is enhanced resource multiplexing between child and parent links of a single IAB node, including support of simultaneous operation (e.g., transmission and/or reception) of the IAB node's child and parent links (e.g., MT Tx/DU Tx, MT Tx/DU Rx, MT Rx/DU Tx, MT Rx/DU Rx). However, there are various problems, issues, and/or difficulties to be overcome to achieve this objective.

Accordingly, embodiments of the present disclosure address these and other problems, issues, and/or difficulties, thereby facilitating the otherwise-advantageous deployment of IAB solutions.

Some embodiments of the present disclosure include methods (e.g., procedures) for IAB node serving a cell in a wireless network. The IAB node can comprise an IAB-DU and IAB-MT.

These exemplary methods can include sending, to an IAB donor centralized unit (CU) in the wireless network, an indication of one or more simultaneous operation capabilities of the IAB-DU and the IAB-MT. These exemplary methods can also include receiving, from the IAB donor CU, a multiplexing configuration based on the simultaneous operation capabilities. These exemplary methods can also include configuring one or more of the following for operation in the cell according to the received multiplexing configuration: one or more child IAB nodes, and one or more UEs.

In some embodiments, these exemplary methods can also include receiving the following from the IAB donor CU: a first configuration of the IAB-MT for operation in a cell served by a parent IAB node; and a second configuration of the IAB-DU for serving the cell. The indication of the simultaneous operation capabilities can be based on the first and second configurations.

In some embodiments, configuring one or more child IAB nodes and/or one or more UEs for operation in the cell can be further based on the second configuration. In some embodiments, these exemplary methods can also include transmitting, to the parent IAB node, an indication of the second configuration of the IAB-DU for serving the cell.

In some embodiments, the first configuration can include an indication of one of the following resource types for each timeslot of the link between the IAB-MT and the parent IAB node: uplink-only, downlink-only, flexible uplink-downlink, and not available. In some embodiments, the second configuration includes an indication of one of the following frequency-domain resource configurations for the cell: Hard (H), Soft (S), and Not Available (NA). In some variants, the second configuration also includes a time-domain resource configuration for the cell.

In some embodiments, these exemplary methods can also include the following: in response to a change in operation conditions related to the cell or the IAB-MT, sending to a parent IAB node a request to update the multiplexing configuration in accordance with the change in operation conditions; receiving from the parent IAB node the updated multiplexing configuration or an indication to use an updated multiplexing configuration that was previously received; and configuring one or more of the following for operation in the cell according to the updated multiplexing configuration indicated by the parent IAB node: the one or more child IAB nodes, and the one or more UEs.

In some of these embodiments, the updated multiplexing configuration can be received from the donor CU together with the multiplexing configuration. In such case, the indication to use the updated multiplexing configuration is received from the parent IAB node.

In some of these embodiments, these exemplary methods can also include sending one of the following to the IAB donor CU: the updated multiplexing configuration or an indication that the updated multiplexing configuration is being used.

In some embodiments, the simultaneous operation capabilities can include any of the following:

- time domain multiplexing (TDM) capability;
- frequency domain multiplexing (FDM) capability;
- spatial domain multiplexing (SDM) capability;
- supported timing modes and/or synchronization procedures;
- supported power control dynamic range;
- power control configurations supported for simultaneous operation; and
- one or more preferred modes for multiplexing between IAB-DU and IAB-MT.

In some embodiments, the multiplexing configuration can include indications of one or more of the following for each of a plurality of timeslots:

- one or more types of multiplexing between IAB-DU and IAB-MT allowed during the timeslot;
- one or more types of traffic allowed during the timeslot; and
- a type of time resource availability for the IAB-DU during the timeslot.

In some of these embodiments, indications in the multiplexing configuration include first indications applicable to downlink-only timeslots, second indications application to uplink-only timeslots; and third indications applicable to flexible uplink-downlink timeslots.

In some embodiments, TDM or FDM is allowed during each of the timeslots. In some of these embodiments, when TDM is indicated as allowed for a timeslot, the multiplexing configuration also includes an indication of one of the following for the timeslot:

- the timeslot is always available for the IAB-DU,
- the availability of the timeslot for the IAB-DU is controlled by a parent IAB node with respect to the IAB node, or
- the timeslot is not available for the IAB-DU; and
- Likewise, when FDM is indicated as allowed for a timeslot, the multiplexing configuration also includes an indication of one of the following for each of a plurality of frequency resources during the timeslot:
- the frequency resource is always available during the timeslot for the IAB-DU,
- the availability of the frequency resource for the IAB-DU during the timeslot is controlled by a parent IAB node with respect to the IAB node, or
- the frequency resource is not available for the IAB-DU during the timeslot.

Other embodiments include methods (e.g., procedures) an IAB donor CU configured to communicate with an IAB node in a wireless network.

These exemplary methods can include receiving, from the IAB node, an indication of one or more simultaneous operation capabilities of an IAB DU and an IAB MT of the IAB node. These exemplary methods can also include determining a multiplexing configuration for the IAB node based on the simultaneous operation capabilities. These exemplary methods can also include sending the multiplexing configuration to the IAB node.

In some embodiments, these exemplary methods can also include sending the following to the IAB node: a first configuration of the IAB-MT for operation in a cell served by a parent IAB node of the IAB node; and a second configuration of the IAB-DU for serving a cell. The indication of the simultaneous operation capabilities can be based on the first and second configurations.

In some of these embodiments, the first configuration can include an indication of one of the following resource types for each timeslot of the link between the IAB-MT and the parent IAB node: uplink-only, downlink-only, flexible uplink-downlink, and not available. In some embodiments, the second configuration can include an indication of one of the following frequency-domain resource configurations for the cell: Hard (H), Soft (S), and Not Available (NA). In some embodiments, the second configuration can also include a time-domain resource configuration for the cell.

In some embodiments, these exemplary methods can also include receiving one of the following from the IAB node: an updated multiplexing configuration being used by the IAB node, or an indication that an updated multiplexing configuration is being used by the IAB node. In some of these embodiments, the indication is received from the IAB node and pertains to an updated multiplexing configuration sent to the IAB node together with the multiplexing configuration.

In various embodiments, the simultaneous operation capabilities can include any of those summarized above in relation to the IAB node embodiments.

In some embodiments, the multiplexing configuration can include indications of one or more of the following for each of a plurality of timeslots:

- one or more types of multiplexing between IAB-DU and IAB-MT allowed during the timeslot;
- one or more types of traffic allowed during the timeslot; and
- a type of time resource availability for the IAB-DU during the timeslot.

In various embodiments, the indicated one or more types of multiplexing allowed, the indicated one or more types of traffic allowed, and the indicated type of time resource availability can have any of the characteristics discussed above in relation to the IAB node embodiments.

In some embodiments, determining the multiplexing configuration for the IAB node can be further based on one or more of the following:

- radio resource management (RRM) or radio link monitoring (RLM) configurations associated with the IAB node, a parent IAB node of the IAB node, and/or one or more child IAB nodes of the IAB nodes; and
- RRM or RLM measurements received from the IAB node, the parent IAB node, and/or the one or more child IAB nodes.

In some embodiments, these exemplary methods can also include sending the multiplexing configuration (e.g., sent to the IAB node) to a parent IAB node of the IAB node.

Other embodiments include methods (e.g., procedures) for a parent IAB node of an IAB node in a wireless network. These exemplary methods can be performed by an IAB node (e.g., IAB-DU and optionally IAB-MT).

These exemplary methods can include receiving, from the IAB node, a request to update a multiplexing configuration for the IAB node based on a change in operation conditions at the IAB node. These exemplary methods can also include determining an updated multiplexing configuration for the IAB node and sending to the IAB node the updated multiplexing configuration or an indication thereof.

In some embodiments, these exemplary methods can also include receiving the multiplexing configuration for the IAB node from an IAB donor CU in the wireless network and configuring the IAB node to operate in a cell served by the parent IAB node in accordance with the multiplexing configuration.

In some of these embodiments, the updated multiplexing configuration is received from the IAB donor CU together with the multiplexing configuration and the indication of the updated multiplexing configuration is sent to the IAB node.

In some of these embodiments, the parent IAB node includes a parent IAB-DU. In such embodiments, these exemplary methods can also include receiving a configuration of the parent IAB-DU from the IAB donor CU. In such embodiments, configuring the IAB node to operate in the cell can be further based on the received configuration of the parent IAB-DU.

In some embodiments, the IAB node includes an IAB distributed unit (DU) and an IAB mobile terminal (MT). In such embodiments, the updated multiplexing configuration can include indications of one or more of the following for each of a plurality of timeslots:

- one or more types of multiplexing between IAB-DU and IAB-MT allowed during the timeslot;
- one or more types of traffic allowed during the timeslot; and
- a type of time resource availability for the IAB-DU during the timeslot.

In various embodiments, indications in the updated multiplexing configuration include first indications applicable to downlink-only timeslots, second indications application to uplink-only timeslots; and third indications applicable to flexible uplink-downlink timeslots.

In some of these embodiments, TDM or FDM is allowed during each of the timeslots. When TDM is indicated as allowed for a timeslot, the updated multiplexing configuration also includes an indication of one of the following for the timeslot:

- the timeslot is always available for the IAB-DU,
- the availability of the timeslot for the IAB-DU is controlled by a parent IAB node with respect to the IAB node, or
- the timeslot is not available for the IAB-DU; and
- Likewise, when FDM is indicated as allowed for a timeslot, the updated multiplexing configuration also includes an indication of one of the following for each of a plurality of frequency resources during the timeslot:
- the frequency resource is always available during the timeslot for the IAB-DU,
- the availability of the frequency resource for the IAB-DU during the timeslot is controlled by a parent IAB node with respect to the IAB node, or
- the frequency resource is not available for the IAB-DU during the timeslot.

In some of these embodiments, these exemplary methods can also include receiving from the IAB node an indication of a configuration used the IAB-DU (i.e., of the IAB node) for serving a cell.

Other embodiments include IAB nodes (e.g., IAB-MT and IAB-DU), IAB donor CUs, and parent IAB nodes configured to perform operations corresponding to any of the exemplary methods described herein. Other embodiments also include non-transitory, computer-readable media storing computer-executable instructions that, when executed by processing circuitry, configure such IAB nodes, IAB donor CUs, or parent IAB nodes to perform operations corresponding to any of the exemplary methods described herein.

These and other embodiments provide various benefits and/or advantages including improved and/or optimized network performance and avoidance of unacceptable interference conditions that could otherwise occur due to simultaneously performing or scheduling UE and IAB transmissions.

These and other objects, features, and advantages of the present disclosure will become apparent upon reading the following Detailed Description in view of the Drawings briefly described below.

BRIEF DESCRIPTION OF THE DRAWINGS

FIG. 4 illustrates parent and child relationships with respect to a particular IAB node.

FIG. 5 shows an exemplary arrangement of CU, DU, and mobile terminal (MT) functionality in an IAB network.

FIG. 6, which includes FIGS. 6A-B, shows two exemplary IAB network topologies.

FIG. 8 shows exemplary coordination relationships between IAB-MT and IAB-DU time resources in tabular form.

FIGS. 23-26 are flow diagrams of exemplary methods (e.g., procedures) for transmission and/or reception of user data.

DETAILED DESCRIPTION

Figure 1:
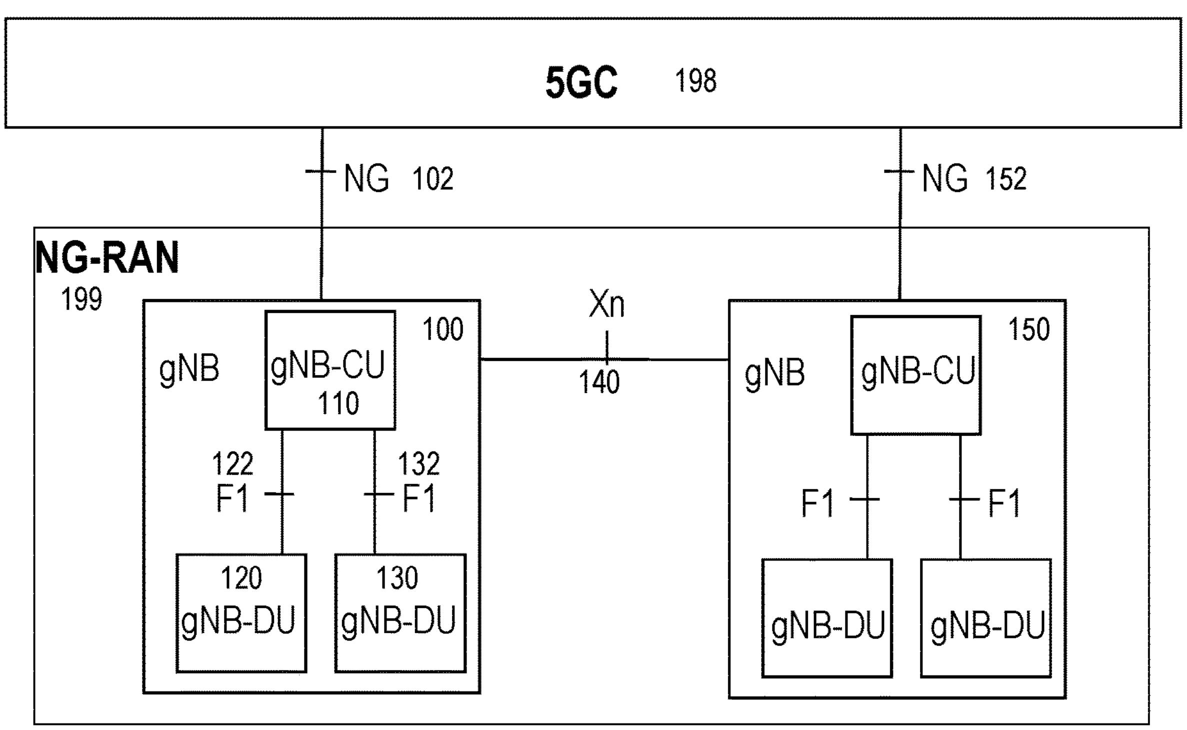
FIG. 1 shows a high-level view of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Parent Node: As used herein, the term "parent node" (or "parent IAB node") refers to a node immediately upstream from a particular IAB node in an IAB network (e.g., an IAB node one hop closer to a donor gNB). Even so, a parent node may be only one of the nodes upstream from the particular IAB node in the network, e.g., if there are multiple hops to a donor gNB.

Child node: As used herein, the term "child node" (or "child IAB node') refers to a node immediately downstream from a particular IAB node (e.g., an IAB node one hop further from a donor gNB) in an IAB network. Even so, a child node may be only one of the nodes downstream from the particular IAB node in the network, e.g., if there are multiple hops to served UEs.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, IAB topology also allows one IAB node to connect to multiple parent nodes. Currently, it is used for back-up or redundancy purposes, e.g., in case of radio link failure of one parent node. It is desirable to use the redundant routes concurrently to achieve load balancing, reliability, etc. but current solutions do not support this arrangement. This is discussed in more detail below, after the following discussion of CU-DU and IAB architectures and protocols.

The F1 interface between the gNB-CU and gNB-DU shown in FIG. 1 is specified and/or based on the following general principles:

- F1 is an open interface;
- F1 supports the exchange of signalling information between respective endpoints, as well as data transmission to the respective endpoints;
- from a logical standpoint, F1 is a point-to-point interface between the endpoints (even in the absence of a physical direct connection between the endpoints);
- F1 supports control plane and user plane separation into respective F1-AP protocol and F1-U protocol (also referred to as NR User Plane Protocol), such that a gNB-CU may also be separated in CP and UP;
- F1 separates Radio Network Layer (RNL) and Transport Network Layer (TNL);
- F1 enables exchange of user equipment (UE) associated information and non-UE associated information;
- F1 is defined to be future proof with respect to new requirements, services, and functions;
- A gNB terminates X2, Xn, NG and S1-U interfaces and, for the F1 interface between DU and CU, utilizes the F1-AP protocol that is defined in 3GPP TS 38.473 (v15.6.0).

In addition, the F1-U protocol is used to convey control information related to the user data flow management of data radio bearers, as defined in 3GPP TS 38.425 (v15.6.0). The F1-U protocol data is conveyed by the GTP-U protocol, more specifically by the "RAN Container" GTP-U extension header as defined in 3GPP TS 29.281 (v15.6.0). In other words, the GTP-U protocol over user datagram protocol (UDP) over Internet Protocol (IP) carries data streams on the F1 interface. A GTP-U "tunnel" between two nodes is identified in each node by tunnel endpoint identifier (TEID), an IP address, and a UDP port number. A GTP-U tunnel is necessary to enable forwarding packets between GTP-U entities.

A CU can host protocols such as RRC and PDCP, while a DU can host protocols such as RLC, MAC and PHY. In other variants, the RLC protocol can be split between CU and DU, with Automatic Retransmission Request (ARQ) functionality in CU. In other variants, a CU can host RRC and PDCP, where PDCP handles both UP (e.g., PDCP-U) and CP (e.g., PDCP-C) traffic.

Figure 2:
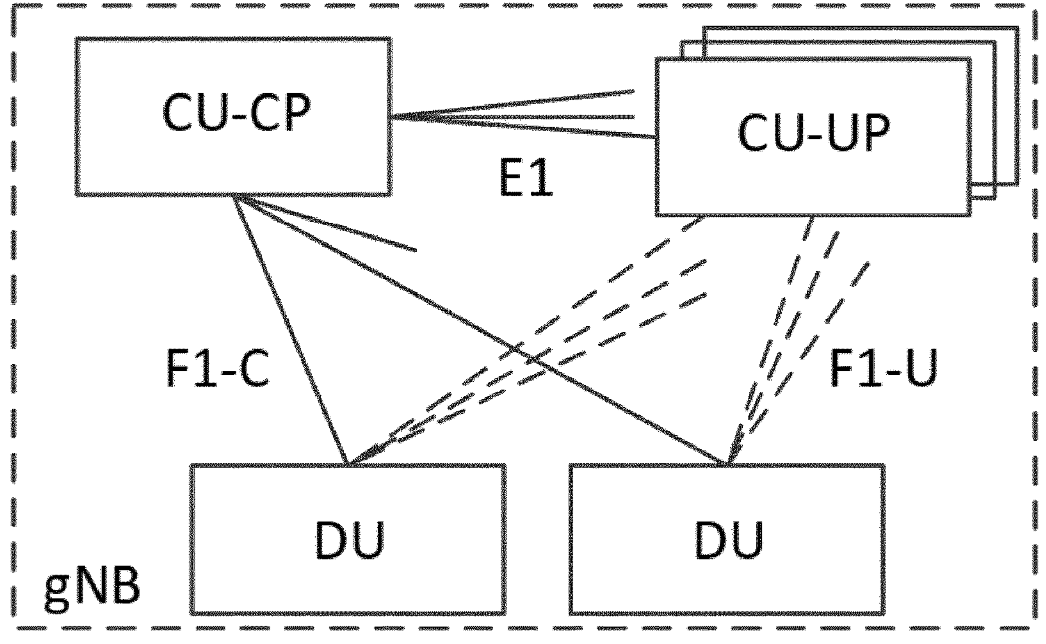
FIG. 2 shows the control-plane (CP) and user-plane (UP) interfaces within the split CU-DU architecture shown in FIG. 1.

Furthermore, centralized control plane protocols (e.g., PDCP-C and RRC) can be hosted in a different CU than centralized user plane protocols (e.g., PDCP-U). In particular, it has also been agreed in 3GPP RAN3 Working Group (WG) to support a separation of the gNB-CU into a CU-CP function (including RRC and PDCP for signaling radio bearers) and CU-UP function (including PDCP for user plane). FIG. 2 shows an exemplary gNB architecture that includes two DUs, a CU-CP, and one or more CU-UPs. As shown in FIG. 2, a single CU-CP can be associated with multiple CU-UPs in a gNB. The CU-CP and CU-UP communicate with each other using the E1-AP protocol over the E1 interface, as specified in 3GPP TS 38.463 (v15.4.0). Furthermore, the F1 interface between CU and DU (see FIG. 1) is functionally split into F1-C between DU and CU-CP and F1-U between DU and CU-UP. Three deployment scenarios for the split gNB architecture shown in FIG. 2 are defined in 3GPP TR 38.806 (v15.0.0):

Scenario 1: CU-CP and CU-UP centralized;

Scenario 2: CU-CP distributed and CU-UP centralized;

Scenario 3: CU-CP centralized and CU-UP distributed.

Figure 3:
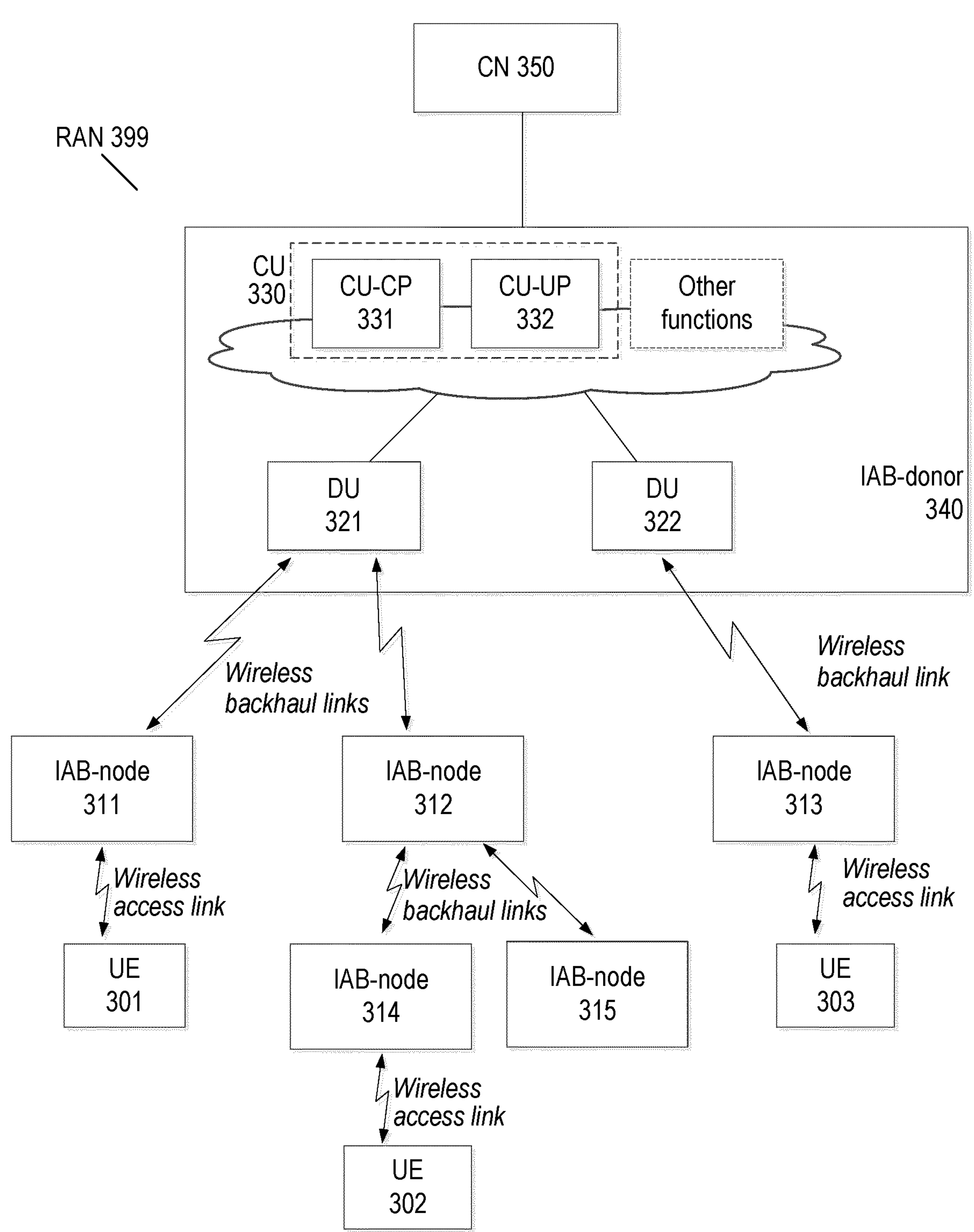
FIG. 3 shows a reference diagram for an integrated access backhaul (IAB) network in standalone mode, as further explained in 3GPP TR 38.874.

FIG. 3 shows a reference diagram for an IAB network in standalone mode, as further explained in 3GPP TR 38.874 (version 0.2.1). The IAB network shown in FIG. 3 includes one IAB-donor 340 and multiple IAB-nodes 311-315, all of which can be part of a radio access network (RAN 399) such as an NG-RAN. IAB donor 340 includes DUs 321, 322 connected to a CU 330, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of a wireless backhaul link towards a corresponding "upstream" (or "northbound") DU function. This MT functionality is similar to functionality that enables UEs to access the IAB network and, in fact, has been specified by 3GPP as part of the Mobile Equipment (ME). However, IAB functionality is transparent to UEs, such that UEs are unaware if they are being served by a conventional gNB or an IAB-donor gNB via one or more intermediate IAB nodes.

In the context of FIG. 3, upstream DUs can include either DU 321 or 322 of IAB donor 340 and, in some cases, a DU function of an intermediate IAB node that is "downstream" (or "southbound") from IAB donor 340. As a more specific example, IAB-node 314 is downstream from IAB-node 312 and DU 321, IAB-node 312 is upstream from IAB-node 314 but downstream from DU 321, and DU 321 is upstream from IAB-nodes 312 and 314. The DU functionality of IAB nodes 311-315 also terminates the radio interface layers of wireless access links towards UEs (e.g., for network access via the DU) and wireless backhaul links towards other downstream IAB nodes. Accordingly, IAB-nodes 311, 313, and 314 can be considered "access IAB nodes" for UEs 301, 303, and 302, respectively, and that term will be used in the same manner hereinafter.

As shown in FIG. 3, IAB-donor 340 can be treated as a single logical node that comprises a set of functions such as gNB-DUs 321-322, gNB-CU-CP 331, gNB-CU-UP 332, and possibly other functions. In some deployments, the IAB-donor can be split according to these functions, which can all be either co-located or non-co-located as allowed by the 3GPP NG-RAN 30) architecture. Also, some of the functions presently associated with the IAB-donor can be moved outside of the IAB-donor if such functions do not perform IAB-specific tasks.

In general, the existing MT, gNB-DU, gNB-CU, UPF, AMF, and SMF as well as the corresponding interfaces NR Uu (between MT and gNB), F1, NG, X2 and N4 are used as baseline for the IAB architectures. For example, each IAB-node DU connects to the IAB-donor CU using a modified form of F1, which is referred to as F1*. The user-plane portion of F1*(referred to as "F1*-U") runs over RLC channels on the wireless backhaul between the MT on the serving IAB-node and the DU on the IAB donor.

As mentioned above, with respect to any particular IAB node, an IAB node one hop closer to a donor gNB is referred to as a "parent node" and an IAB node one hop further from a donor gNB is referred to as a "child node". FIG. 4 illustrates the parent and child relationships with respect to a particular IAB node. Furthermore, the backhaul (BH) link between the parent node and the IAB node is referred to as parent (backhaul) link, whereas the backhaul link between the IAB node and the child node is referred to as child (backhaul) link. Each of these BH links include uplink (UL) and downlink (DL). Furthermore, Figure shows UL and DL access links from the intermediate IAB node to a UE.

As mentioned above, the IAB architecture also adopts the CU/DU split of gNBs in which time-critical functionalities are realized in DU closer to the radio and less time-critical functionalities are centralized in the CU. In general, an IAB donor CU contains all gNB-CU functions of all downstream IAB nodes relative to that IAB donor and connects to the 5GC via the NG interface. Each IAB node then hosts the gNB-DU function that handles downstream communications as well as an MT function that handles upstream communication. The MT is a logical unit that provides UE-like functions. Each IAB-DU establishes RLC channels to UEs and/or to MTs of connected IAB-node. Each IAB-MT establishes BH radio interface towards the parent IAB-node or IAB-donor. FIG. 5 shows an exemplary arrangement of CU, DU, and MT functionality in an IAB network.

Wireless BH links—including IAB—are vulnerable to blockage, e.g., due to moving objects such as vehicles, seasonal changes (foliage), severe weather conditions (rain, snow or hail), or infrastructure changes (new buildings). Traffic variations can also create uneven load distribution on wireless backhaul links, leading to link- or node-level congestion. In view of those concerns, the IAB topology supports redundant paths as another difference compared to the Rel-10 LTE relay.

FIG. 6, which includes FIGS. 6A-B, shows two exemplary IAB network topologies. More specifically, FIG. 6A shows a spanning tree (ST) topology, in which there is only one route between each IAB-node and IAB-donor. In other words, each IAB node has only a single parent node but can have one or more child nodes. FIG. 6B shows a directed acyclic graph (DAG) topology that supports redundant routes between each IAB-node and the IAB donor CU. In other words, each IAB node can have one or more parent nodes and one or more child nodes.

Figure 7:
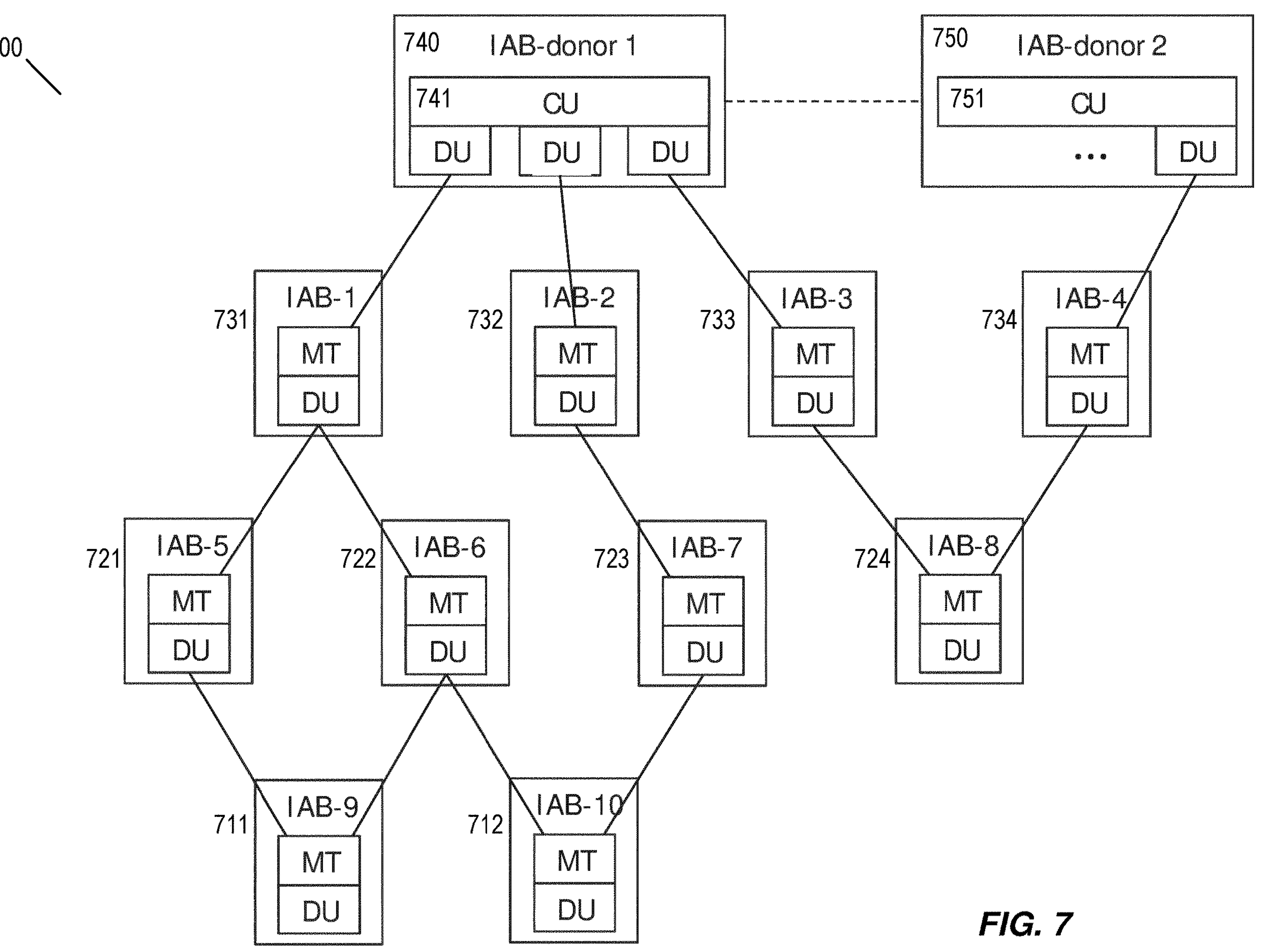
FIG. 7 shows another IAB network topology that includes various multi-parent arrangements.

FIG. 7 shows an exemplary IAB network (700) that includes various multi-parent arrangements. In particular, IAB-9 (711) connects to IAB-donor 1 (740) via two parent nodes IAB-5 (721) and IAB-6 (722), which connect to the same parent node IAB-1 (731). Also, IAB-10 (712) connects to IAB-donor 1 (740) via two parent nodes IAB-6 (722) and IAB-7 (723), which have different parent nodes IAB-1 (731) and IAB-2 (732). In addition, IAB-8 (713) connects to two parent nodes IAB-3 (733) and IAB-4 (734), which connect to different IAB-donors (740 and 750). These arrangements are exemplary of various other multi-parent arrangements. Each of the IAB donors includes a CU (741 and 751) and one or more DUs.

The multi-connectivity or route redundancy shown in FIGS. 6B and 7 may be used for back-up purposes. It is also desirable to use redundant routes concurrently to achieve load balancing, improve reliability, etc. To do so, however, resource coordination is required.

In case of in-band operation, an IAB node is typically subject to a half-duplex constraint, whereby it can only be in transmission or reception mode at any given time. Rel-16 IAB mainly considers the time-division multiplexing (TDM) case where the MT and DU resources of the same IAB-node are separated in time. Based on this consideration, various resource types have been defined for IAB MT and DU.

For an IAB-MT, as defined in Rel-15, the link to the parent node can include DL time resources, UL time resources, and flexible (F) time resources. Likewise, for an IAB-DU, the link to the child node can include DL time resources, UL time resources, F time resources, and unavailable (NA) time resources (i.e., resources not to be used for communication on the DU child links). Each of the DL, UL and F time resources of the DU child link can belong to one of the following two categories:

- Hard (H): The corresponding time resource is always available for the DU child link.
- Soft (S): The availability of the corresponding time resource for the DU child link is explicitly and/or implicitly controlled by the parent node.

The IAB DU resources are configured per cell, and the H/S/NA attributes for the DU resource configuration are explicitly indicated per-resource type (D/U/F) in each slot. As a result, the semi-static time-domain resources of the IAB-DU can be of seven different types: DL-H, DL-S, UL-H, UL-S, F-H, F-S, and NA. FIG. 8 shows exemplary coordination relationships between IAB-MT and IAB-DU time resources in tabular form.

Figure 9:
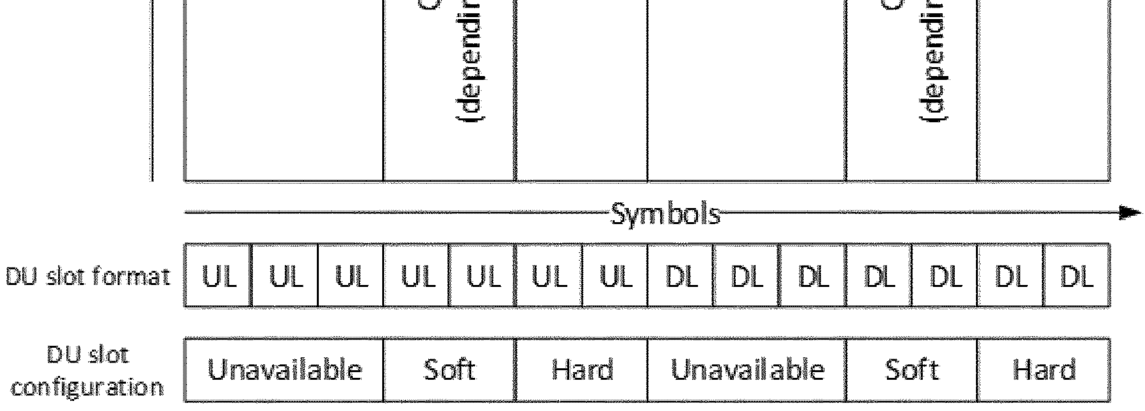
FIG. 9 shows an exemplary IAB-DU resource configuration that uses time-domain multiplexing (TDM) across different timeslots.

Furthermore, an IAB-DU may correspond to multiple cells, including cells operating on different carrier frequencies. Similarly, an MT function may correspond to multiple carrier frequencies. This can either be implemented by one MT unit operating on multiple carrier frequencies or by multiple MT units, each operating on a different carrier frequency. The H/S/NA attributes for the per-cell DU resource configuration should take into account the associated MT carrier frequency(ies). FIG. 9 shows an exemplary DU resource configuration that uses TDM across different timeslots.

To facilitate the resource configuration, the donor CU and the parent node can be made aware of the multiplexing capability between MT and DU (TDM required, TDM not required) of an IAB node to for any {MT component carrier (CC), DU cell} pair. Furthermore, the indication of the multiplexing capability for the case of no-TDM between IAB MT and IAB DU is additionally provided with respect to each transmission-direction combination (per MT CC/DU cell pair), i.e., MT-TX/DU-TX, MT-TX/DU-RX, MT-RX/DU-TX, and MT-RX/DU-RX. The corresponding signaling has been defined in 3GPP TS 38.473 section 9.3.1.108 as part of the F1 application protocol (F1-AP) information element (IE), which is layer-3 (L3) signaling.

Figure 10:
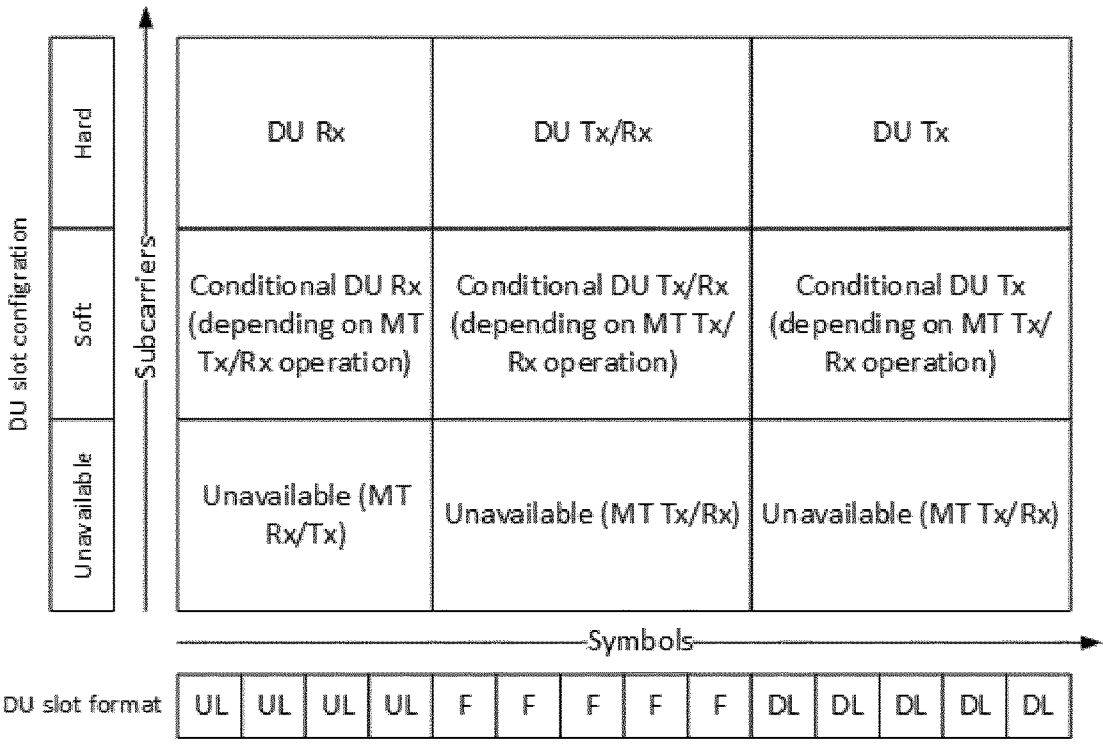
FIG. 10 shows an exemplary IAB-DU resource configuration that uses TDM across different symbols as well as frequency-domain multiplexing (FDM) within each timeslot.

Rel-16 IAB mainly considers the TDM case where the IAB-DU and IAB-MT resources of the same IAB-node are separated in time (e.g., as shown in FIG. 9). Rel-17 IAB will consider simultaneous operation of IAB-DU and IAB-MT, e.g., frequency-domain multiplexing (FDM) and spatial-domain multiplexing (SDM). FIG. 10 shows an exemplary DU resource configuration that uses TDM across different timeslots as well as FDM within each timeslot.

Depending on other network configurations, however, all traffic may not be suitable for simultaneous operation. For example, simultaneously receiving a weak UE and a strong parent IAB-DU may cause an IAB-MT to erroneously decode the UE transmission. Accordingly, Applicant has recognized a need for techniques to facilitate co-existence of different multiplexing modes in one IAB node.

Additionally, or alternatively, due to simultaneous operation of IAB-DU and IAB-MT, it may be preferable to differentiate access and backhaul traffic, e.g., to avoid unacceptable interference scenarios. The above example also applies here, i.e., that a weak UE transmission may be erroneously decoded if received simultaneously as a stronger parent IAB-DU in the IAB node. Accordingly, Applicant has recognized a need for techniques to facilitate separation of access and backhaul traffic in certain slots/symbols.

Embodiments of the present disclosure address these and other problems, difficulties, and/or issues by providing flexible and efficient signaling techniques that facilitate an IAB node (i.e., MT and DU) to operate in simultaneous operation mode, differentiating with respect to multiplexing modes and traffic types (access or backhaul) among different slots. Accordingly, embodiments provide various benefits and/or advantages including improved and/or optimized network performance and avoidance of unacceptable interference conditions that could otherwise occur due to simultaneously performing or scheduling UE and IAB transmissions.

In the following description, the term "resource" refers generally to time, frequency, and spatial resources, unless explicitly noted to the contrary.

Figure 11:
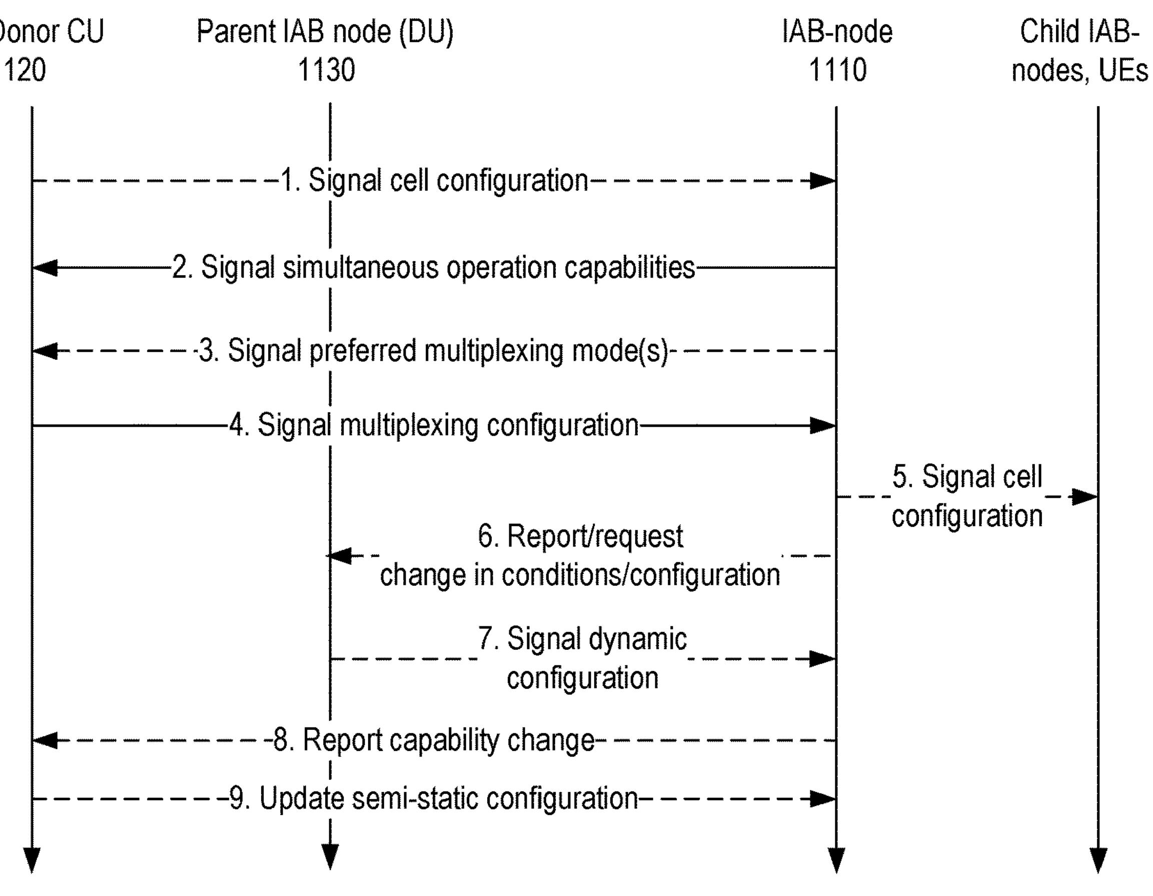
FIG. 11 shows a signal flow diagram that illustrates various embodiments of the present disclosure.

FIG. 11 shows a signal flow diagram that illustrates various embodiments of the present disclosure. More specifically, FIG. 11 shows signaling between a donor CU (1110), a DU of a parent IAB node (1130), an IAB node (1120, IAB-MT and IAB-DU), and one or more child IAB nodes and/or UEs. Although the operations in FIG. 11 are given numbers, these are intended to facilitate explanation rather than to imply or require a particular order, unless expressly stated otherwise. Optional operations are indicated by dashed lines.

In operation 1, the IAB node receives basic serving cell configurations for IAB-MT and IAB-DU from the donor CU. This information may include carriers to operate on, bandwidth, subcarrier spacing, etc. In operation 2, the IAB node signals a capability of simultaneous operation to the donor CU, based on the received serving cell configurations for the IAB-MT and IAB-DU. This information may include a capability of FDM and/or SDM, and in case of SDM, the number of parallel beams that may be supported. It may further include capabilities of interference mitigation, such as:

support for specified DU-to-DU, MT-to-MT, DU-to-MT and/or MT-to-DU interference mitigation;

timing, e.g., supported timing modes and timing synchronization procedures; and power control, e.g., dynamic range of IAB node, etc. for the network to know what kind of restrictions apply to the IAB node.

In operation 3, the IAB node signals a preferred mode of operation to the donor CU. The preferred mode of operation may include IAB-DU and IAB-MT multiplexing. In operation 4, the IAB node receives a semi-static multiplexing configuration from the donor CU, particularly related to the provided capabilities. For example, the semi-static multiplexing configuration can be provided by F1-AP signaling. The donor CU may determine the multiplexing configuration based on overall network performance requirements and/or conditions. For example, the donor CU is responsible for the resource configuration of all IAB-nodes and for configuration of measurements and measurement reporting for Radio Resource Management (RRM) and Radio Link Monitoring (RLM). The donor CU can determine the multiplexing configuration sent in operation 4 based on RRM/RLM reporting configurations and/or measurement reports received.

In some embodiments, the multiplexing configuration provided in operation 4 can include differentiation of slots between multiplexing types available. For example, the donor CU can indicate which slots may be used for FDM and/or SDM and which slots are to be used for TDM, with respect to IAB-MT and IAB-DU transmissions. The differentiation may be indicated explicitly, implicitly, or by a combination thereof. For example, FDM/SDM slots can be indicated explicitly and TDM slots can be determined as the remaining slots (or vice versa). For slots indicated as FDM/SDM, a further indication may be provided to differentiate H, S, and NA parts of the carrier with respect to the IAB-DU, while for TDM, only one of H, S or NA may be configured. The multiplexing configuration may include separate indications for UL, DL, and F slots.

Figure 12:
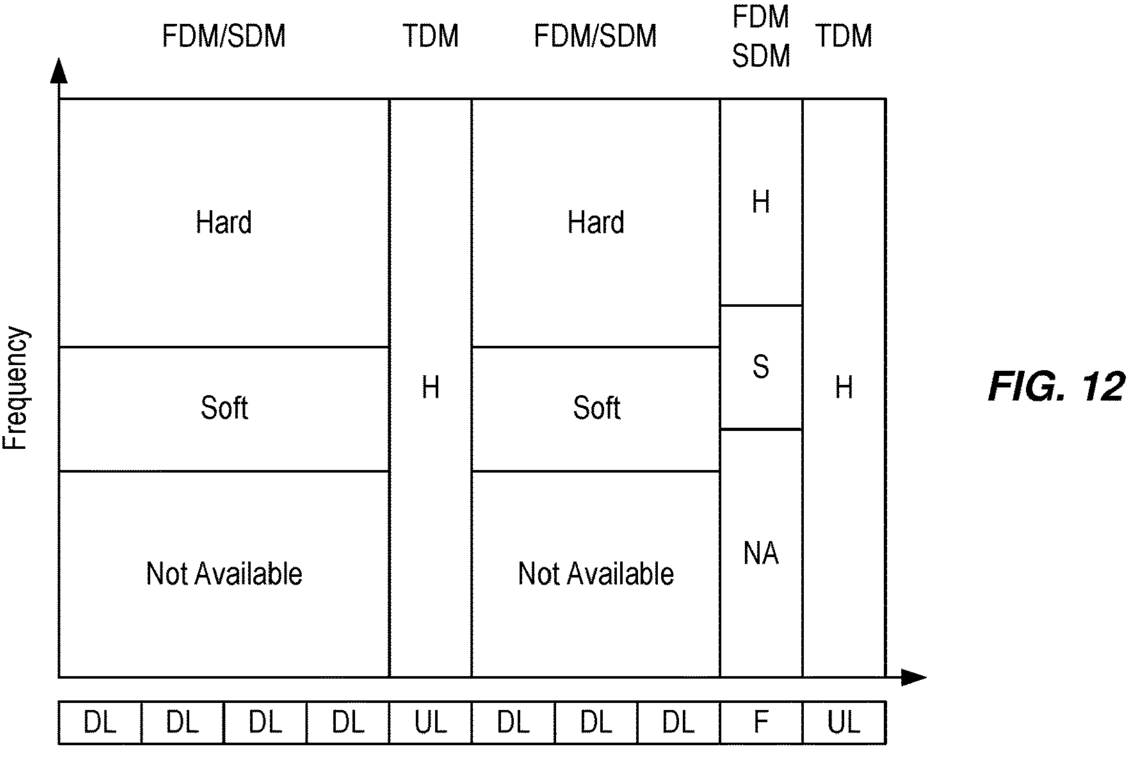
FIG. 12 shows an exemplary multiplexing configuration according to various embodiments of the present disclosure.

FIG. 12 shows an exemplary multiplexing configuration that illustrates certain ones of these embodiments. In this example, DL slots are configured as FDM/SDM and for those, the carrier is partitioned into H, S, or NA, such that both IAB-DU and IAB-MT may use their corresponding parts of the spectrum. Furthermore, UL slots are configured as TDM and H, such that the IAB-DU may exclusively use them for UL traffic.

Although FIG. 12 shows an example of two different available multiplexing modes (i.e., TDM and FDM/SDM), it is also possible to differentiate/indicate which of three different multiplexing modes—TDM, FDM, and SDM—should be used in each symbol or slot. For example, slots for two of the modes can be indicated explicitly while slots for the third mode can be inferred from lack of explicit indication for those slots.

Figures 13, 14:
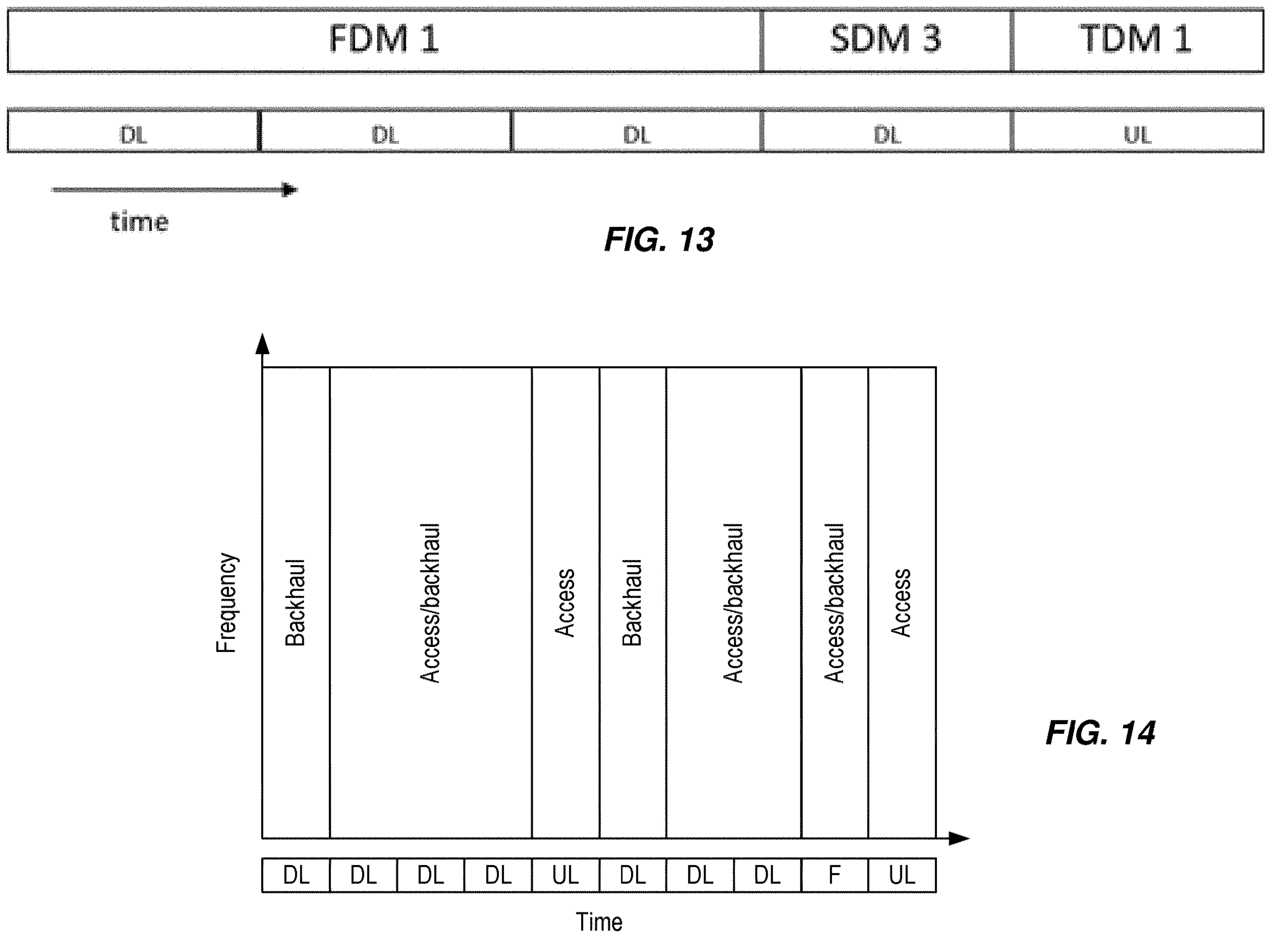
FIG. 13 shows an exemplary arrangement where a donor IAB-CU configures at least three different multiplexing configurations and indicates to an IAB node which applies to each of the timeslots shown.
FIG. 14 shows an exemplary traffic type configuration according to various embodiments of the present disclosure.

In some embodiments, the donor CU can provide the IAB node with multiple multiplexing configurations having different TDM/FDM/SDM arrangements, and then indicate to the UE which of the configurations are used in each slot. For example, this can be done via F1-AP signaling. FIG. 13 shows an exemplary arrangement where the donor CU configures at least three different multiplexing configurations (called FDM1, SDM3, and TDM1) and indicates to an IAB node which of the three applies to each of the timeslots shown. It should be noted, however, that other multiplexing configurations may be configured by the donor CU and indicated for use in slots before or after the slots shown.

In some embodiments, the multiplexing configuration provided in operation 4 can include differentiation of slots between traffic types. For example, the donor CU can indicate slots to be used for backhaul traffic (to/from other IAB nodes), slots to be used for access traffic (to/from UEs), and slots that can be used for both access and backhaul traffic. Like multiplexing, differentiation between traffic types may be indicated explicitly, implicitly, or by a combination thereof. For example, backhaul and access slots can be indicated explicitly and the remaining slots (i.e., those not explicitly indicated) are implicit as the other category. As a more specific example, the donor CU may indicate that backhaul traffic is restricted to DL slots and/or that UL slots are reserved for UL access traffic. More generally, the configuration be further separated into UL, DL and F slots.

FIG. 14 shows an exemplary traffic type configuration that illustrates certain ones of these embodiments. In this example, the first and sixth slots are reserved for backhaul traffic while the fifth and tenth slots are reserved for access traffic. Other slots are shared between access and backhaul traffic. For example, the reservations of slots 1, 5-6, and 10 can be indicated explicitly while the arrangement of the other slots can be inferred from a lack of explicit indication for those slots.

Returning to FIG. 11, in operation 5 the IAB-DU signals operational configurations to child IAB-nodes and/or UEs in the cell. For example, by providing its own semi-static resource configuration to a child IAB-node, the IAB-DU can prepare the child IAB-node for a smooth switch between different multiplexing operation modes. At the same time, the IAB-node can also provide the child IAB-node with suitable operational configurations for different multiplexing modes, such as timing, power-control configurations, etc.

In some embodiments, the donor-CU can provide the IAB-node's semi-static resource configuration to the IAB-node's parent IAB-node. By knowing the resource multiplexing pattern of its child IAB-node (i.e., the "IAB-node" in FIG. 11), the parent IAB-node can prepare for a smooth switch between the different multiplexing modes. At the same time, the parent IAB-node can provide related operational configurations that its child IAB-node should adopt in different multiplexing modes, including timing, power control configurations, etc.

In operation 6, the IAB-node can report its temporary capability change to its parent IAB-DU and request a change of the multiplexing configuration. This may be reported due to a change in conditions, such that the IAB node is not able/allowed to operate in its simultaneous operation mode. For example, this change could be a change in timing beyond a limit required for simultaneous operation, an interference level making simultaneous operation disadvantageous, a power control configuration preventing simultaneous operation due to a resulting increased interference, etc.

In operation 7, the parent IAB-node can respond to the IAB-node's request for change of multiplexing configuration. If the IAB-node provided a proposed multiplexing configuration along with the request in operation 6, the parent IAB-node can respond with ACK/NACK of the proposed multiplexing configuration. In case of a NACK, the parent IAB-node can optionally provide in operation 7 a different (e.g., updated) multiplexing configuration than proposed in operation 6. If the IAB-node did not provide a proposed resource configuration along with the request in operation 6, the parent IAB-node can provide an updated multiplexing configuration in operation 7 (or an indication that such is not available).

In some embodiments, the parent IAB-node can use downlink control information (DCI) or similar signaling (e.g., MAC CE) to dynamically indicate a resource configuration (or change) to the IAB-node. In some embodiments, the parent IAB-node can use a bitmap, with each bit in the bitmap having a value of 0 or 1. In some variants, each bit can correspond to a slot or symbol, with each 0/1 value corresponding to a different traffic type or multiplexing setting for that slot or symbol. For example, the parent IAB-node can use two bitmaps, one each for traffic mode and multiplexing setting.

In operation 8, the IAB-node can report any multiplexing capability change made in operation 7 to the donor-CU. In operation 9, based on the updated multiplexing capability of the IAB-node, the donor-CU can provide an updated semi-static configuration pattern to the IAB-node.

Figure 15:
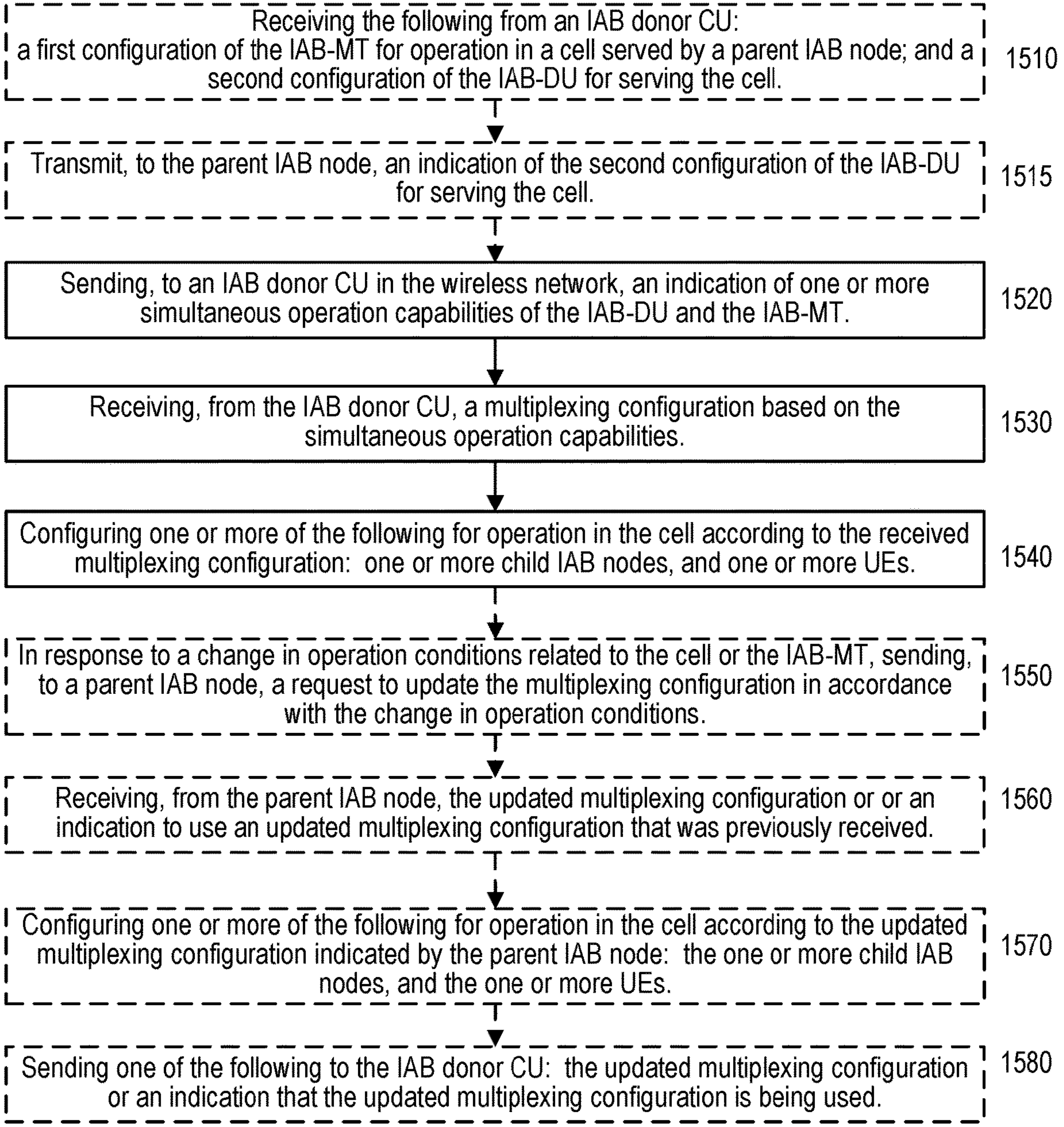
FIG. 15 shows an exemplary method (e.g., procedure) for an IAB node, according to various embodiments of the present disclosure.
Figures 16, 17:
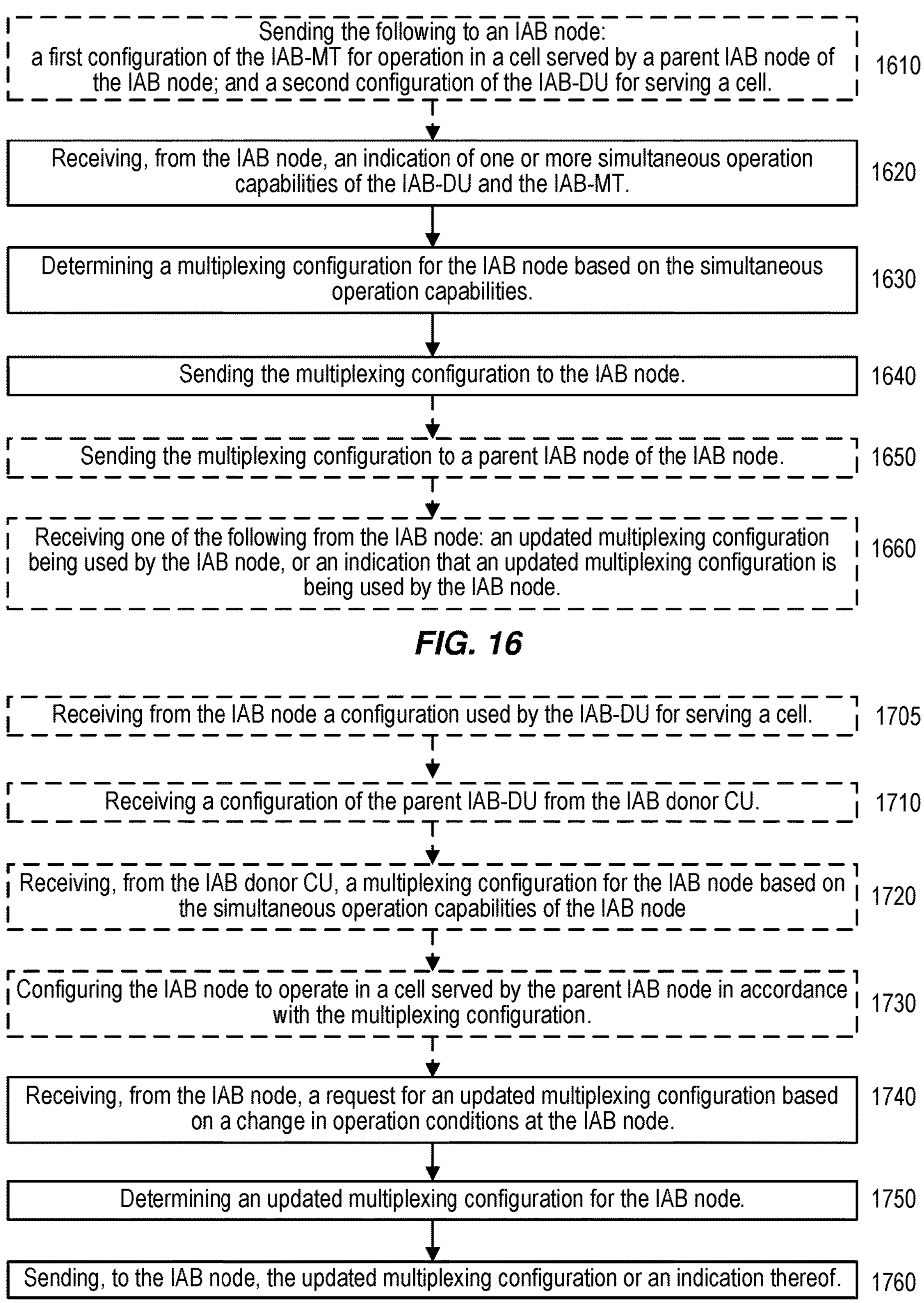
FIG. 16 shows an exemplary method (e.g., procedure) for an IAB donor CU, according to various embodiments of the present disclosure.
FIG. 17 shows an exemplary method (e.g., procedure) for a parent IAB node of an IAB node, according to various embodiments of the present disclosure.

The embodiments described above can be further illustrated with reference to FIGS. 15-17, which depict exemplary methods (e.g., procedures) for an IAB node, an IAB donor CU, and a parent IAB node, respectively. Put differently, various features of the operations described below correspond to various embodiments described above. The exemplary methods shown in FIGS. 15-17 can be used cooperatively to provide benefits, advantages, and/or solutions to problems described herein. Although the exemplary methods are illustrated in FIGS. 15-17 by specific blocks in particular orders, the operations corresponding to the blocks can be performed in different orders than shown and can be combined and/or divided into blocks and/or operations having different functionality than shown. Optional blocks or operations are indicated by dashed lines.

More specifically, FIG. 15 illustrates an exemplary method (e.g., procedure) for an IAB node serving a cell in a wireless network, according to various embodiments of the present disclosure. The exemplary method shown in FIG. 15 can be performed by an IAB node comprising an IAB-DU and IAB-MT, such as described elsewhere herein.

The exemplary method can include the operations of block 1520, where the IAB node can send, to an IAB donor CU in the wireless network, an indication of one or more simultaneous operation capabilities of the IAB-DU and the IAB-MT. The exemplary method can also include the operations of block 1530, where the IAB node can receive, from the IAB donor CU, a multiplexing configuration based on the simultaneous operation capabilities. The exemplary method can also include the operations of block 1540, where the IAB node can configure one or more of the following for operation in the cell according to the received multiplexing configuration: one or more child IAB nodes, and one or more user equipment (UEs).

In some embodiments, the exemplary method can also include the operations of block 1510, where the IAB node can receive the following from the IAB donor CU: a first configuration of the IAB-MT for operation in a cell served by a parent IAB node; and a second configuration of the IAB-DU for serving the cell. The indication of the simultaneous operation capabilities (e.g., sent in block 1520) can be based on the first and second configurations.

In some embodiments, configuring one or more child IAB nodes and/or one or more UEs for operation in the cell (e.g., in block 1540) can be further based on the second configuration. In some embodiments, the exemplary method can also include the operations of block 1515, where the IAB node can transmit, to the parent IAB node, an indication of the second configuration of the IAB-DU for serving the cell.

In some embodiments, the first configuration can include an indication of one of the following resource types for each timeslot of the link between the IAB-MT and the parent IAB node: uplink-only, downlink-only, flexible uplink-downlink, and not available. In some embodiments, the second configuration includes an indication of one of the following frequency-domain resource configurations for the cell: Hard (H), Soft (S), and Not Available (NA). In some variants, the second configuration also includes a time-domain resource configuration for the cell.

In some embodiments, the exemplary method can also include the operations of blocks 1550-1570. In block 1550, the IAB node can, in response to a change in operation conditions related to the cell or the IAB-MT, send to a parent IAB node a request to update the multiplexing configuration in accordance with the change in operation conditions. In block 1560, the IAB node can receive, from the parent IAB node, the updated multiplexing configuration or an indication to use an updated multiplexing configuration that was previously received. In block 1570, the IAB node can configure one or more of the following for operation in the cell according to the updated multiplexing configuration indicated by the parent IAB node: the one or more child IAB nodes, and the one or more UEs.

In some of these embodiments, the updated multiplexing configuration can be received from the donor CU together with the multiplexing configuration (e.g., in block 1530). In such case, the indication to use the updated multiplexing configuration is received from the parent IAB node in block 1560.

In some of these embodiments, the exemplary method can also include the operations of block 1580, where the IAB node can send one of the following to the IAB donor CU: the updated multiplexing configuration or an indication that the updated multiplexing configuration is being used.

In some embodiments, the simultaneous operation capabilities (e.g., indicated in block 1520) can include any of the following:

- time domain multiplexing (TDM) capability;
- frequency domain multiplexing (FDM) capability;
- spatial domain multiplexing (SDM) capability;
- supported timing modes and/or synchronization procedures;
- supported power control dynamic range;
- power control configurations supported for simultaneous operation; and
- one or more preferred modes for multiplexing between IAB-DU and IAB-MT.

In some embodiments, the multiplexing configuration (e.g., sent in block 1520) can include indications of one or more of the following for each of a plurality of timeslots:

- one or more types of multiplexing between IAB-DU and IAB-MT allowed during the timeslot;
- one or more types of traffic allowed during the timeslot; and
- a type of time resource availability for the IAB-DU during the timeslot.

In some of these embodiments, indications in the multiplexing configuration include first indications applicable to downlink-only timeslots, second indications application to uplink-only timeslots; and third indications applicable to flexible uplink-downlink timeslots.

In some embodiments, time domain multiplexing (TDM) or frequency domain multiplexing (FDM) is allowed during each of the timeslots. In some of these embodiments, when TDM is indicated as allowed for a timeslot, the multiplexing configuration also includes an indication of one of the following for the timeslot:

- the timeslot is always available for the IAB-DU, the availability of the timeslot for the IAB-DU is controlled by a parent IAB node with respect to the IAB node, or the timeslot is not available for the IAB-DU; and Likewise, when FDM is indicated as allowed for a timeslot, the multiplexing configuration also includes an indication of one of the following for each of a plurality of frequency resources during the timeslot:

the frequency resource is always available during the timeslot for the IAB-DU, the availability of the frequency resource for the IAB-DU during the timeslot is controlled by a parent IAB node with respect to the IAB node, or the frequency resource is not available for the IAB-DU during the timeslot.

In some of these embodiments, the one or more types of traffic allowed during each timeslot including one or more of the following: backhaul traffic between the IAB node and either a parent IAB node or a child IAB node; and access traffic between the IAB-MT and UEs.

In some variants, timeslots during which only one of backhaul traffic and access traffic is allowed are indicated explicitly and timeslots during which both backhaul traffic and access traffic are allowed are indicated implicitly. In some variants, the multiplexing configuration can further indicate that one of backhaul traffic and access traffic is allowed in downlink timeslots, and uplink timeslots are reserved for the other of backhaul traffic and access traffic.

In addition, FIG. 16 illustrates an exemplary method (e.g., procedure) for an IAB donor CU configured to communicate with an IAB node in a wireless network, according to various embodiments of the present disclosure. The exemplary method shown in FIG. 16 can be performed by an IAB donor CU such as described elsewhere herein.

The exemplary method can include the operations of block 1620, where the IAB donor CU can receive, from the IAB node, an indication of one or more simultaneous operation capabilities of an IAB-DU and an IAB-MT of the IAB node. The exemplary method can also include the operations of block 1630, where the IAB donor CU can determine a multiplexing configuration for the IAB node based on the simultaneous operation capabilities. The exemplary method can also include the operations of block 1640, where the IAB donor CU can send the multiplexing configuration to the IAB node.

In some embodiments, the exemplary method can also include the operations of blocks 1610, where the IAB donor CU can send the following to the IAB node: a first configuration of the IAB-MT for operation in a cell served by a parent IAB node of the IAB node; and a second configuration of the IAB-DU for serving a cell. The indication of the simultaneous operation capabilities (e.g., received in block 1620) can be based on the first and second configurations.

In some of these embodiments, the first configuration can include an indication of one of the following resource types for each timeslot of the link between the IAB-MT and the parent IAB node: uplink-only, downlink-only, flexible uplink-downlink, and not available. In some embodiments, the second configuration can include an indication of one of the following frequency-domain resource configurations for the cell: Hard (H), Soft (S), and Not Available (NA). In some embodiments, the second configuration can also include a time-domain resource configuration for the cell.

In some embodiments, the exemplary method can also include the operations of block 1660, where the IAB donor CU can receive one of the following from the IAB node: an updated multiplexing configuration being used by the IAB node, or an indication that an updated multiplexing configuration is being used by the IAB node. In some of these embodiments, the indication is received from the IAB node and pertains to an updated multiplexing configuration sent to the IAB node together with the multiplexing configuration (i.e., in block 1640).

In various embodiments, the simultaneous operation capabilities (e.g., received in block 1620) can include any of those discussed above in relation to the IAB node embodiments.

In some embodiments, the multiplexing configuration (e.g., sent in block 1640) can include indications of one or more of the following for each of a plurality of timeslots:

one or more types of multiplexing between IAB-DU and IAB-MT allowed during the timeslot;

one or more types of traffic allowed during the timeslot; and a type of time resource availability for the IAB-DU during the timeslot.

In various embodiments, the indicated one or more types of multiplexing allowed, the indicated one or more types of traffic allowed, and the indicated type of time resource availability can have any of the characteristics discussed above in relation to the IAB node embodiments.

In some embodiments, determining the multiplexing configuration for the IAB node (e.g., in block 1630) can be further based on one or more of the following:

radio resource management (RRM) or radio link monitoring (RLM) configurations associated with the IAB node, a parent IAB node of the IAB node, and/or one or more child IAB nodes of the IAB nodes; and RRM or RLM measurements received from the IAB node, the parent IAB node, and/or the one or more child IAB nodes.

In some embodiments, the exemplary method can also include the operations of block 1650, where the IAB donor CU can send the multiplexing configuration (e.g., sent to the IAB node in block 1640) to a parent IAB node of the IAB node.

In addition, FIG. 17 illustrates an exemplary method (e.g., procedure) for a parent IAB node of an IAB node in a wireless network, according to various embodiments of the present disclosure. The exemplary method shown in FIG. 17 can be performed by an IAB node (e.g., IAB-DU and optionally an IAB-MT) such as described elsewhere herein.

The exemplary method can include the operations of block 1740, where the parent IAB node can receive, from the IAB node, a request to update a multiplexing configuration of the IAB node based on a change in operation conditions at the IAB node. The exemplary method can also include the operations of block 1750, where the parent IAB node can determine an updated multiplexing configuration for the IAB node. The exemplary method can also include the operations of block 1760, where the parent IAB node can send to the IAB node the updated multiplexing configuration or an indication thereof.

In some embodiments, the exemplary method can also include the operations of blocks 1720-1730, where the parent IAB node can receive the multiplexing configuration for the IAB node from an IAB donor CU in the wireless network and configure the IAB node to operate in a cell served by the parent IAB node in accordance with the multiplexing configuration.

In some of these embodiments, the updated multiplexing configuration is received from the IAB donor CU together with the multiplexing configuration (e.g., in block 1720) and the indication of the updated multiplexing configuration is sent to the IAB node (i.e., in block 1760).

In some of these embodiments, the parent IAB node includes a parent IAB-DU. In such embodiments, the exemplary method can also include the operations of block 1710, where the parent IAB node can receive a configuration of the parent IAB-DU from the IAB donor CU. In such embodiments, configuring the IAB node to operate in the cell (e.g., in block 1730) is further based on the received configuration of the parent IAB-DU.

In some embodiments, the IAB node includes an IAB-DU and an IAB-MT. In such embodiments, the updated multiplexing configuration can include indications of one or more of the following for each of a plurality of timeslots:

- one or more types of multiplexing between IAB-DU and IAB-MT allowed during the timeslot;
- one or more types of traffic allowed during the timeslot; and
- a type of time resource availability for the IAB-DU during the timeslot.

In various embodiments, indications in the updated multiplexing configuration include first indications applicable to downlink-only timeslots, second indications application to uplink-only timeslots; and third indications applicable to flexible uplink-downlink timeslots.

In some of these embodiments, TDM or FDM is allowed during each of the timeslots. When TDM is indicated as allowed for a timeslot, the updated multiplexing configuration also includes an indication of one of the following for the timeslot:

- the timeslot is always available for the IAB-DU,
- the availability of the timeslot for the IAB-DU is controlled by a parent IAB node with respect to the IAB node, or
- the timeslot is not available for the IAB-DU; and
- Likewise, when FDM is indicated as allowed for a timeslot, the updated multiplexing configuration also includes an indication of one of the following for each of a plurality of frequency resources during the timeslot:
- the frequency resource is always available during the timeslot for the IAB-DU,
- the availability of the frequency resource for the IAB-DU during the timeslot is controlled by a parent IAB node with respect to the IAB node, or
- the frequency resource is not available for the IAB-DU during the timeslot.

In some of these embodiments, the exemplary method can also include the operations of block 1705, where the parent IAB node can receive from the IAB node an indication of a configuration used the IAB-DU (i.e., of the IAB node) for serving a cell. This indication can correspond to the indication of the second configuration sent by the IAB node, discussed above in relation to IAB node embodiments.

Figure 18:
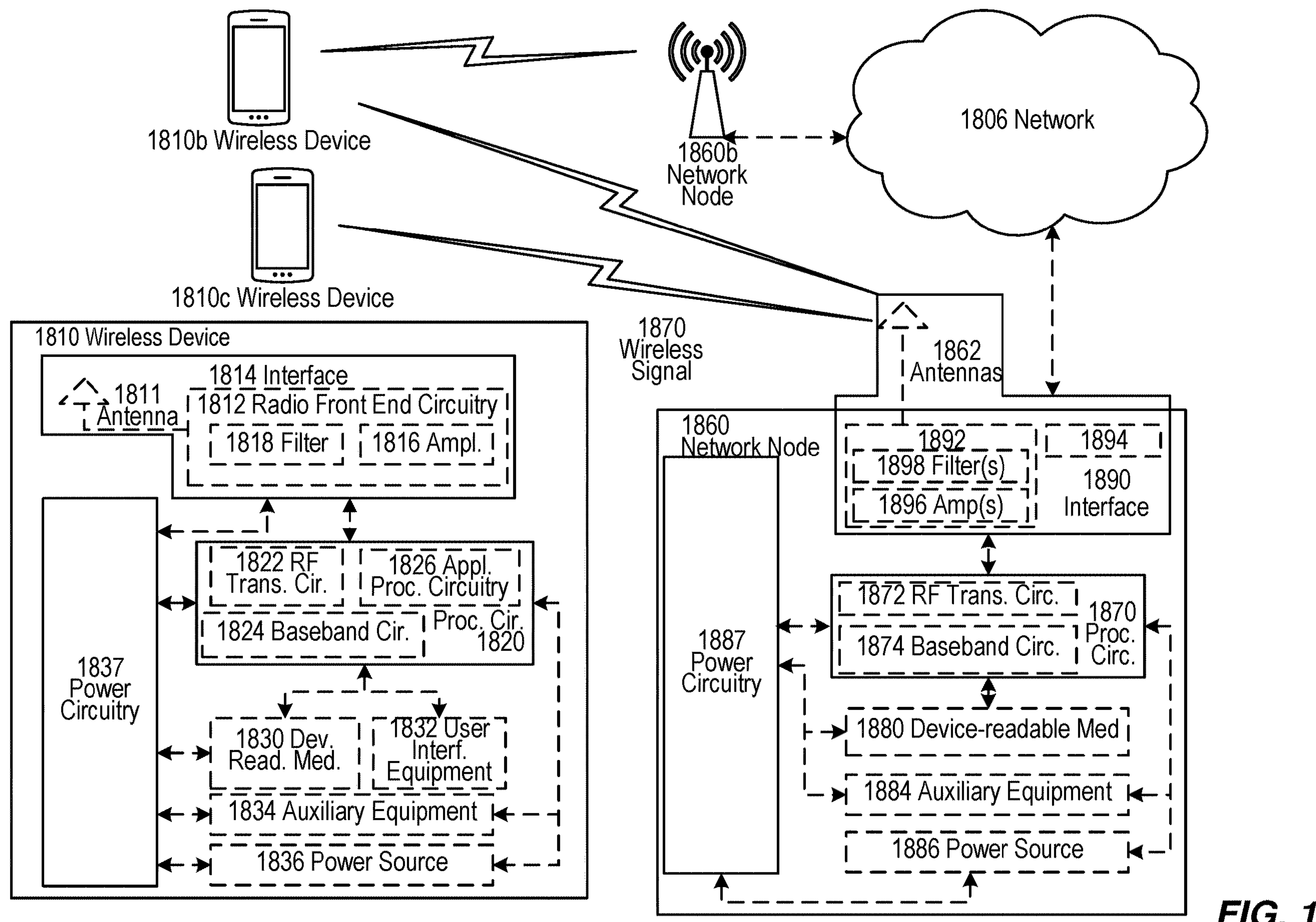
FIG. 18 shows an embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 18. For simplicity, the wireless network of FIG. 18 only depicts network 1806, network nodes 1860 and 1860*b*, and WDs 1810, 1810*b*, and 1810*c*. In practice, a wireless network can further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1806 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 18, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIG. 18 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1860 are depicted as single boxes located within a larger box, or nested within multiple boxes, in practice, a network node can comprise multiple different physical components that make up a single illustrated component (e.g., device readable medium 1880 can comprise multiple separate hard drives as well as multiple RAM modules).

Similarly, network node 1860 can be composed of multiple physically separate components (e.g., a NodeB component and a RNC component, or a BTS component and a BSC component, etc.), which can each have their own respective components. In certain scenarios in which network node 1860 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1860 can be configured to support multiple radio access technologies (RATs). In such embodiments, some components can be duplicated (e.g., separate device readable medium 1880 for the different RATs) and some components can be reused (e.g., the same antenna 1862 can be shared by the RATs). Network node 1860 can also include multiple sets of the various illustrated components for different wireless technologies integrated into network node 1860, such as, for example, GSM, WCDMA, LTE, NR, WiFi, or Bluetooth wireless technologies. These wireless technologies can be integrated into the same or different chip or set of chips and other components within network node 1860.

Processing circuitry 1870 can be configured to perform any determining, calculating, or similar operations (e.g., certain obtaining operations) described herein as being provided by a network node. These operations performed by processing circuitry 1870 can include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1860, either alone or in conjunction with other network node 1860 components (e.g., device readable medium 1880). Such functionality can include any of the various wireless features, functions, or benefits discussed herein.

For example, processing circuitry 1870 can execute instructions stored in device readable medium 1880 or in memory within processing circuitry 1870. In some embodiments, processing circuitry 1870 can include a system on a chip (SOC). As a more specific example, instructions (also referred to as a computer program product) stored in medium 1880 can include instructions that, when executed by processing circuitry 1870, can configure network node 1860 to perform operations corresponding to various exemplary methods (e.g., procedures) described herein.

In some embodiments, processing circuitry 1870 can include one or more of radio frequency (RF) transceiver circuitry 1872 and baseband processing circuitry 1874. In some embodiments, radio frequency (RF) transceiver circuitry 1872 and baseband processing circuitry 1874 can be on separate chips (or sets of chips), boards, or units, such as radio units and digital units. In alternative embodiments, part or all of RF transceiver circuitry 1872 and baseband processing circuitry 1874 can be on the same chip or set of chips, boards, or units In certain embodiments, some or all of the functionality described herein as being provided by a network node, base station, eNB or other such network device can be performed by processing circuitry 1870 executing instructions stored on device readable medium 1880 or memory within processing circuitry 1870. In alternative embodiments, some or all of the functionality can be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860 but are enjoyed by network node 1860 as a whole, and/or by end users and the wireless network generally.

Device readable medium 1880 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1870. Device readable medium 1880 can store any suitable instructions, data or information, including a computer program, software, an application including one or more of logic, rules, code, tables, etc. and/or other instructions capable of being executed by processing circuitry 1870 and, utilized by network node 1860. Device readable medium 1880 can be used to store any calculations made by processing circuitry 1870 and/or any data received via interface 1890. In some embodiments, processing circuitry 1870 and device readable medium 1880 can be considered to be integrated.

Interface 1890 is used in the wired or wireless communication of signaling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that can be coupled to, or in certain embodiments a part of, antenna 1862. Radio front end circuitry 1892 comprises filters 1898 and amplifiers 1896. Radio front end circuitry 1892 can be connected to antenna 1862 and processing circuitry 1870. Radio front end circuitry can be configured to condition signals communicated between antenna 1862 and processing circuitry 1870. Radio front end circuitry 1892 can receive digital data that is to be sent out to other network nodes or WDs via a wireless connection. Radio front end circuitry 1892 can convert the digital data into a radio signal having the appropriate channel and bandwidth parameters using a combination of filters 1898 and/or amplifiers 1896. The radio signal can then be transmitted via antenna 1862. Similarly, when receiving data, antenna 1862 can collect radio signals which are then converted into digital data by radio front end circuitry 1892. The digital data can be passed to processing circuitry 1870. In other embodiments, the interface can comprise different components and/or different combinations of components.

In certain alternative embodiments, network node 1860 may not include separate radio front end circuitry 1892, instead, processing circuitry 1870 can comprise radio front end circuitry and can be connected to antenna 1862 without separate radio front end circuitry 1892. Similarly, in some embodiments, all or some of RF transceiver circuitry 1872 can be considered a part of interface 1890. In still other embodiments, interface 1890 can include one or more ports or terminals 1894, radio front end circuitry 1892, and RF transceiver circuitry 1872, as part of a radio unit (not shown), and interface 1890 can communicate with baseband processing circuitry 1874, which is part of a digital unit (not shown).

Antenna 1862 can include one or more antennas, or antenna arrays, configured to send and/or receive wireless signals. Antenna 1862 can be coupled to radio front end circuitry 1890 and can be any type of antenna capable of transmitting and receiving data and/or signals wirelessly. In some embodiments, antenna 1862 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1862 can be separate from network node 1860 and can be connectable to network node 1860 through an interface or port.

Antenna 1862, interface 1890, and/or processing circuitry 1870 can be configured to perform any receiving operations and/or certain obtaining operations described herein as being performed by a network node. Any information, data and/or signals can be received from a wireless device, another network node and/or any other network equipment. Similarly, antenna 1862, interface 1890, and/or processing circuitry 1870 can be configured to perform any transmitting operations described herein as being performed by a network node. Any information, data and/or signals can be transmitted to a wireless device, another network node and/or any other network equipment.

Power circuitry 1887 can comprise, or be coupled to, power management circuitry and can be configured to supply the components of network node 1860 with power for performing the functionality described herein. Power circuitry 1887 can receive power from power source 1886. Power source 1886 and/or power circuitry 1887 can be configured to provide power to the various components of network node 1860 in a form suitable for the respective components (e.g., at a voltage and current level needed for each respective component). Power source 1886 can either be included in, or external to, power circuitry 1887 and/or network node 1860. For example, network node 1860 can be connectable to an external power source (e.g., an electricity outlet) via an input circuitry or interface such as an electrical cable, whereby the external power source supplies power to power circuitry 1887. As a further example, power source 1886 can comprise a source of power in the form of a battery or battery pack which is connected to, or integrated in, power circuitry 1887. The battery can provide backup power should the external power source fail. Other types of power sources, such as photovoltaic devices, can also be used.

Alternative embodiments of network node 1860 can include additional components beyond those shown in FIG. 18 that can be responsible for providing certain aspects of the network node's functionality, including any of the functionality described herein and/or any functionality necessary to support the subject matter described herein. For example, network node 1860 can include user interface equipment to allow and/or facilitate input of information into network node 1860 and to allow and/or facilitate output of information from network node 1860. This can allow and/or facilitate a user to perform diagnostic, maintenance, repair, and other administrative functions for network node 1860.

In some embodiments, a wireless device (WD, e.g., WD 1810) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 can include multiple sets of one or more of the illustrated components for different wireless technologies supported by WD 1810, such as, for example, GSM, WCDMA, LTE, NR, WiFi, WiMAX, or Bluetooth wireless technologies, just to mention a few. These wireless technologies can be integrated into the same or different chips or set of chips as other components within WD 1810.

Antenna 1811 can include one or more antennas or antenna arrays, configured to send and/or receive wireless signals, and is connected to interface 1814. In certain alternative embodiments, antenna 1811 can be separate from WD 1810 and be connectable to WD 1810 through an interface or port. Antenna 1811, interface 1814, and/or processing circuitry 1820 can be configured to perform any receiving or transmitting operations described herein as being performed by a WD. Any information, data and/or signals can be received from a network node and/or another WD. In some embodiments, radio front end circuitry and/or antenna 1811 can be considered an interface.

As illustrated, interface 1814 comprises radio front end circuitry 1812 and antenna 1811. Radio front end circuitry 1812 comprise one or more filters 1818 and amplifiers 1815. Radio front end circuitry 1814 is connected to antenna 1811 and processing circuitry 1820 and can be configured to condition signals communicated between antenna 1811 and processing circuitry 1820. Radio front end circuitry 1812 can be coupled to or a part of antenna 1811. In some embodiments, WD 1810 may not include separate radio front end circuitry 1812; rather, processing circuitry 1820 can comprise radio front end circuitry and can be connected to antenna 1811. Similarly, in some embodiments, some or all of RF transceiver circuitry 1822 can be considered a part of interface 1814. Radio front end circuitry 1812 can receive digital data that is to be sent out to other network nodes or WDs via a wireless connection. Radio front end circuitry 1812 can convert the digital data into a radio signal having the appropriate channel and bandwidth parameters using a combination of filters 1818 and/or amplifiers 1815. The radio signal can then be transmitted via antenna 1811. Similarly, when receiving data, antenna 1811 can collect radio signals which are then converted into digital data by radio front end circuitry 1812. The digital data can be passed to processing circuitry 1820. In other embodiments, the interface can comprise different components and/or different combinations of components.

Processing circuitry 1820 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1810 functionality either alone or in combination with other WD 1810 components, such as device readable medium 1830. Such functionality can include any of the various wireless features or benefits discussed herein.

For example, processing circuitry 1820 can execute instructions stored in device readable medium 1830 or in memory within processing circuitry 1820 to provide the functionality disclosed herein. More specifically, instructions (also referred to as a computer program product) stored in medium 1830 can include instructions that, when executed by processor 1820, can configure wireless device 1810 to perform operations corresponding to various exemplary methods (e.g., procedures) described herein.

As illustrated, processing circuitry 1820 includes one or more of RF transceiver circuitry 1822, baseband processing circuitry 1824, and application processing circuitry 1826. In other embodiments, the processing circuitry can comprise different components and/or different combinations of components. In certain embodiments processing circuitry 1820 of WD 1810 can comprise a SOC. In some embodiments, RF transceiver circuitry 1822, baseband processing circuitry 1824, and application processing circuitry 1826 can be on separate chips or sets of chips. In alternative embodiments, part or all of baseband processing circuitry 1824 and application processing circuitry 1826 can be combined into one chip or set of chips, and RF transceiver circuitry 1822 can be on a separate chip or set of chips. In still alternative embodiments, part or all of RF transceiver circuitry 1822 and baseband processing circuitry 1824 can be on the same chip or set of chips, and application processing circuitry 1826 can be on a separate chip or set of chips. In yet other alternative embodiments, part or all of RF transceiver circuitry 1822, baseband processing circuitry 1824, and application processing circuitry 1826 can be combined in the same chip or set of chips. In some embodiments, RF transceiver circuitry 1822 can be a part of interface 1814. RF transceiver circuitry 1822 can condition RF signals for processing circuitry 1820.

In certain embodiments, some or all of the functionality described herein as being performed by a WD can be provided by processing circuitry 1820 executing instructions stored on device readable medium 1830, which in certain embodiments can be a computer-readable storage medium. In alternative embodiments, some or all of the functionality can be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 can be configured to perform any determining, calculating, or similar operations (e.g., certain obtaining operations) described herein as being performed by a WD. These operations, as performed by processing circuitry 1820, can include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 can be operable to store a computer program, software, an application including one or more of logic, rules, code, tables, etc. and/or other instructions capable of being executed by processing circuitry 1820. Device readable medium 1830 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device 25 readable and/or computer executable memory devices that store information, data, and/or instructions that can be used by processing circuitry 1820. In some embodiments, processing circuitry 1820 and device readable medium 1830 can be considered to be integrated.

User interface equipment 1832 can include components that allow and/or facilitate a human user to interact with WD 1810. Such interaction can be of many forms, such as visual, audial, tactile, etc. User interface equipment 1832 can be operable to produce output to the user and to allow and/or facilitate the user to provide input to WD 1810. The type of interaction can vary depending on the type of user interface equipment 1832 installed in WD 1810. For example, if WD 1810 is a smart phone, the interaction can be via a touch screen; if WD 1810 is a smart meter, the interaction can be through a screen that provides usage (e.g., the number of gallons used) or a speaker that provides an audible alert (e.g., if smoke is detected). User interface equipment 1832 can include input interfaces, devices and circuits, and output interfaces, devices and circuits. User interface equipment 1832 can be configured to allow and/or facilitate input of information into WD 1810 and is connected to processing circuitry 1820 to allow and/or facilitate processing circuitry 1820 to process the input information. User interface equipment 1832 can include, for example, a microphone, a proximity or other sensor, keys/buttons, a touch display, one or more cameras, a USB port, or other input circuitry. User interface equipment 1832 is also configured to allow and/or facilitate output of information from WD 1810, and to allow and/or facilitate processing circuitry 1820 to output information from WD 1810. User interface equipment 1832 can include, for example, a speaker, a display, vibrating circuitry, a USB port, a headphone interface, or other output circuitry. Using one or more input and output interfaces, devices, and circuits, of user interface equipment 1832, WD 1810 can communicate with end users and/or the wireless network and allow and/or facilitate them to benefit from the functionality described herein.

Auxiliary equipment 1834 is operable to provide more specific functionality which may not be generally performed by WDs. This can comprise specialized sensors for doing measurements for various purposes, interfaces for additional types of communication such as wired communications etc. The inclusion and type of components of auxiliary equipment 1834 can vary depending on the embodiment and/or scenario.

Power source 1836 can, in some embodiments, be in the form of a battery or battery pack. Other types of power sources, such as an external power source (e.g., an electricity outlet), photovoltaic devices or power cells, can also be used. WD 1810 can further comprise power circuitry 1837 for delivering power from power source 1836 to the various parts of WD 1810 which need power from power source 1836 to carry out any functionality described or indicated herein. Power circuitry 1837 can in certain embodiments comprise power management circuitry. Power circuitry 1837 can additionally or alternatively be operable to receive power from an external power source; in which case WD 1810 can be connectable to the external power source (such as an electricity outlet) via input circuitry or an interface such as an electrical power cable. Power circuitry 1837 can also in certain embodiments be operable to deliver power from an external power source to power source 1836. This can be, for example, for the charging of power source 1836. Power circuitry 1837 can perform any converting or other modification to the power from power source 1836 to make it suitable for supply to the respective components of WD 1810.

Figure 19:
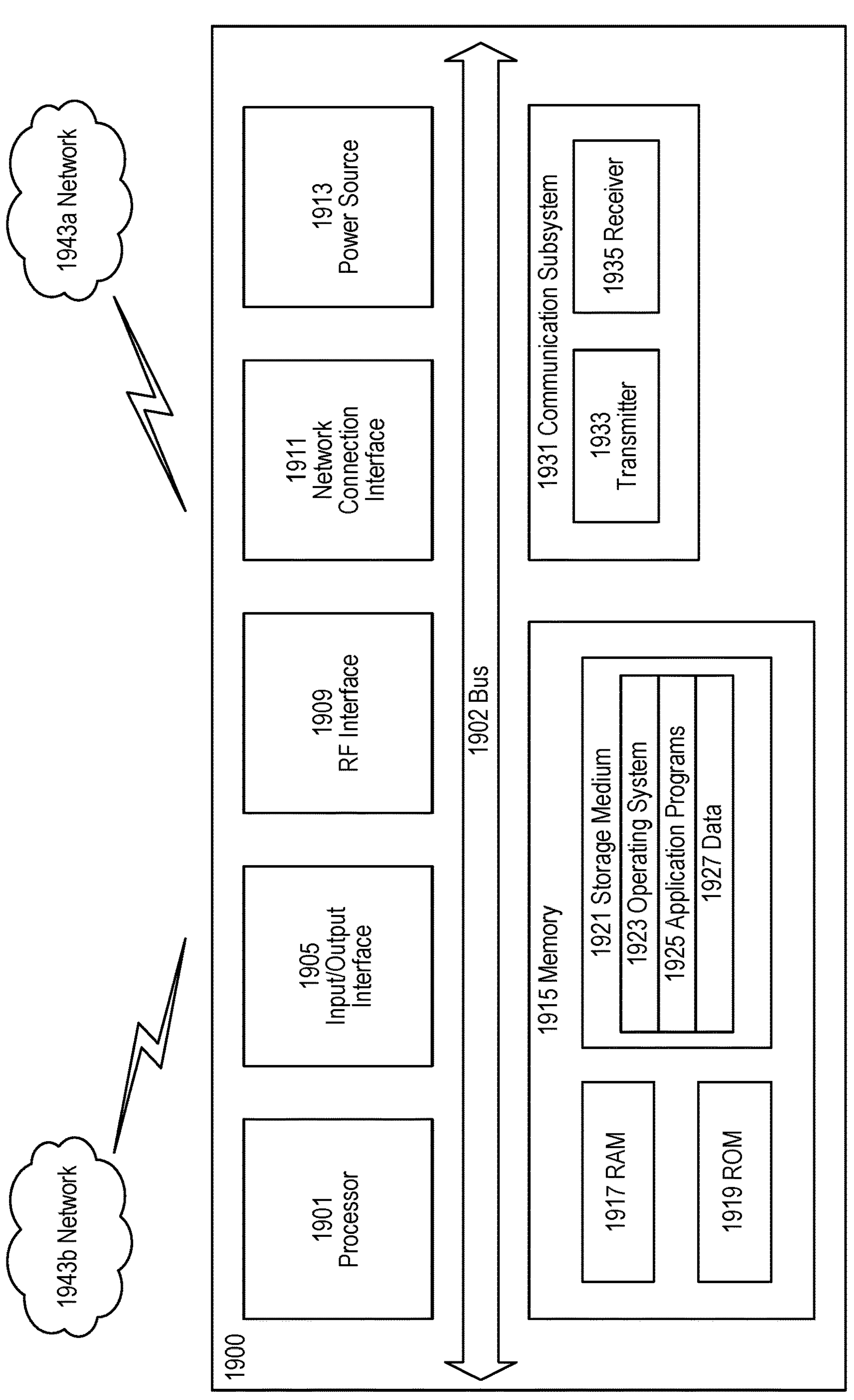
FIG. 19 shows an embodiment of a UE, in accordance with various aspects described herein.

FIG. 19 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1900 can be any UE identified by the 3$^{rd}$ Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 19 is a UE, the components discussed herein are equally applicable to a WD, and vice-versa.

In FIG. 19, UE 1900 includes processing circuitry 1901 that is operatively coupled to input/output interface 1905, radio frequency (RF) interface 1909, network connection interface 1911, memory 1915 including random access memory (RAM) 1916, read-only memory (ROM) 1919, and storage medium 1921 or the like, communication subsystem 1931, power source 1933, and/or any other component, or any combination thereof. Storage medium 1921 includes operating system 1923, application program 1925, and data 1927. In other embodiments, storage medium 1921 can include other similar types of information. Certain UEs can utilize all of the components shown in FIG. 19, or only a subset of the components. The level of integration between the components can vary from one UE to another UE. Further, certain UEs can contain multiple instances of a component, such as multiple processors, memories, transceivers, transmitters, receivers, etc.

In FIG. 19, processing circuitry 1901 can be configured to process computer instructions and data. Processing circuitry 1901 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1901 can include two central processing units (CPUs). Data can be information in a form suitable for use by a computer.

In the depicted embodiment, input/output interface 1905 can be configured to provide a communication interface to an input device, output device, or input and output device. UE 1900 can be configured to use an output device via input/output interface 1905. An output device can use the same type of interface port as an input device. For example, a USB port can be used to provide input to and output from UE 1900. The output device can be a speaker, a sound card, a video card, a display, a monitor, a printer, an actuator, an emitter, a smartcard, another output device, or any combination thereof. UE 1900 can be configured to use an input device via input/output interface 1905 to allow and/or facilitate a user to capture information into UE 1900. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 19, RF interface 1909 can be configured to provide a communication interface to RF components such as a transmitter, a receiver, and an antenna. Network connection interface 1911 can be configured to provide a communication interface to network 1943*a*. Network 1943*a* can encompass wired and/or wireless networks such as a local-area network (LAN), a wide-area network (WAN), a computer network, a wireless network, a telecommunications network, another like network or any combination thereof. For example, network 1943*a* can comprise a Wi-Fi network. Network connection interface 1911 can be configured to include a receiver and a transmitter interface used to communicate with one or more other devices over a communication network according to one or more communication protocols, such as Ethernet, TCP/IP, SONET, ATM, or the like. Network connection interface 1911 can implement receiver and transmitter functionality appropriate to the communication network links (e.g., optical, electrical, and the like). The transmitter and receiver functions can share circuit components, software or firmware, or alternatively can be implemented separately.

RAM 1916 can be configured to interface via bus 1902 to processing circuitry 1901 to provide storage or caching of data or computer instructions during the execution of software programs such as the operating system, application programs, and device drivers. ROM 1919 can be configured to provide computer instructions or data to processing circuitry 1901. For example, ROM 1919 can be configured to store invariant low-level system code or data for basic system functions such as basic input and output (I/O), startup, or reception of keystrokes from a keyboard that are stored in a non-volatile memory. Storage medium 1921 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1921 can be configured to include operating system 1923; application program 1925 such as a web browser application, a widget or gadget engine or another application; and data file 1927. Storage medium 1921 can store, for use by UE 1900, any of a variety of various operating systems or combinations of operating systems. For example, application program 1925 can include executable program instructions (also referred to as a computer program product) that, when executed by processor 1901, can configure UE 1900 to perform operations corresponding to various exemplary methods (e.g., procedures) described herein.

Storage medium 1921 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 can allow and/or facilitate UE 1900 to access computer-executable instructions, application programs or the like, stored on transitory or non-transitory memory media, to off-load data, or to upload data. An article of manufacture, such as one utilizing a communication system can be tangibly embodied in storage medium 1921, which can comprise a device readable medium.

In FIG. 19, processing circuitry 1901 can be configured to communicate with network 1943*b* using communication subsystem 1931. Network 1943*a* and network 1943*b* can be the same network or networks or different network or networks. Communication subsystem 1931 can be configured to include one or more transceivers used to communicate with network 1943*b*. For example, communication subsystem 1931 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1933 and/or receiver 1935 to implement transmitter or receiver functionality, respectively, appropriate to the RAN links (e.g., frequency allocations and the like). Further, transmitter 1933 and receiver 1935 of each transceiver can share circuit components, software or firmware, or alternatively can be implemented separately.

In the illustrated embodiment, the communication functions of communication subsystem 1931 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 can include cellular communication, Wi-Fi communication, Bluetooth communication, and GPS communication. Network 1943*b* can encompass wired and/or wireless networks such as a local-area network (LAN), a wide-area network (WAN), a computer network, a wireless network, a telecommunications network, another like network or any combination thereof. For example, network 1943*b* can be a cellular network, a Wi-Fi network, and/or a near-field network. Power source 1913 can be configured to provide alternating current (AC) or direct current (DC) power to components of UE 1900.

The features, benefits and/or functions described herein can be implemented in one of the components of UE 1900 or partitioned across multiple components of UE 1900. Further, the features, benefits, and/or functions described herein can be implemented in any combination of hardware, software or firmware. In one example, communication subsystem 1931 can be configured to include any of the components described herein. Further, processing circuitry 1901 can be configured to communicate with any of such components over bus 1902. In another example, any of such components can be represented by program instructions stored in memory that when executed by processing circuitry 1901 perform the corresponding functions described herein. In another example, the functionality of any of such components can be partitioned between processing circuitry 1901 and communication subsystem 1931. In another example, the non-computationally intensive functions of any of such components can be implemented in software or firmware and the computationally intensive functions can be implemented in hardware.

Figure 20:
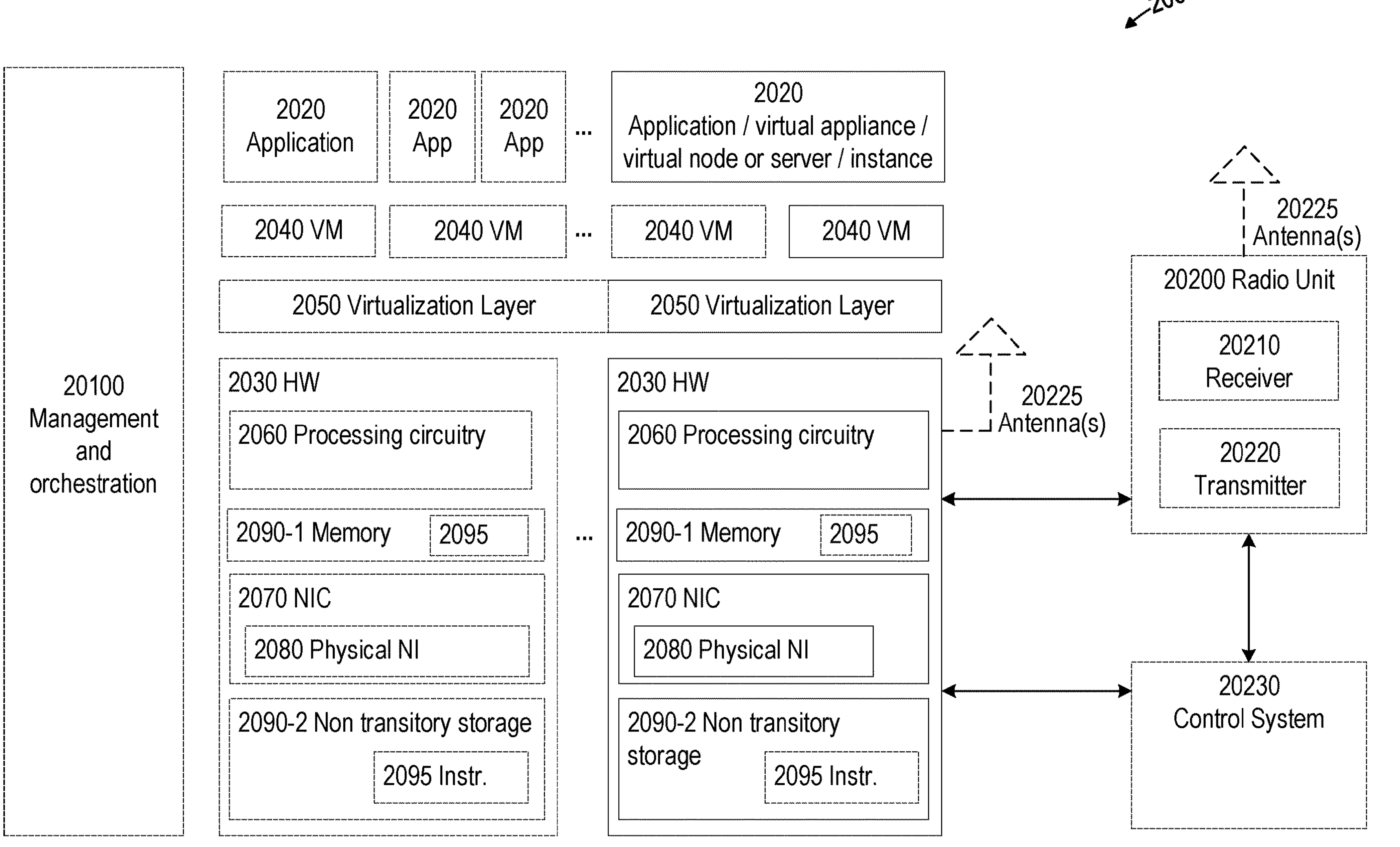
FIG. 20 is a block diagram illustrating an exemplary virtualization environment usable for implementation of various embodiments of network nodes described herein.

FIG. 20 is a schematic block diagram illustrating a virtualization environment 2000 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node can be entirely virtualized.

The functions can be implemented by one or more applications 2020 (which can alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000 can include general-purpose or special-purpose network hardware devices (or nodes) 2030 comprising a set of one or more processors or processing circuitry 2060, which can be commercial off-the-shelf (COTS) processors, dedicated Application Specific Integrated Circuits (ASICs), or any other type of processing circuitry including digital or analog hardware components or special purpose processors. Each hardware device can comprise memory 2090-1 which can be non-persistent memory for temporarily storing instructions 2095 or software executed by processing circuitry 2060. For example, instructions 2095 can include program instructions (also referred to as a computer program product) that, when executed by processing circuitry 2060, can configure hardware node 2020 to perform operations corresponding to various exemplary methods (e.g., procedures) described herein. Such operations can also be attributed to virtual node(s) 2020 that is/are hosted by hardware node 2030.

Each hardware device can comprise one or more network interface controllers (NICs) 2070, also known as network interface cards, which include physical network interface 2080. Each hardware device can also include non-transitory, persistent, machine-readable storage media 2090-2 having stored therein software 2095 and/or instructions executable by processing circuitry 2060. Software 2095 can include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and can be run by a corresponding virtualization layer 2050 or hypervisor. Different embodiments of the instance of virtual appliance 2020 can be implemented on one or more of virtual machines 2040, and the implementations can be made in different ways.

During operation, processing circuitry 2060 executes software 2095 to instantiate the hypervisor or virtualization layer 2050, which can sometimes be referred to as a virtual machine monitor (VMM). Virtualization layer 2050 can present a virtual operating platform that appears like networking hardware to virtual machine 2040.

As shown in FIG. 20, hardware 2030 can be a standalone network node with generic or specific components. Hardware 2030 can comprise antenna 20225 and can implement some functions via virtualization. Alternatively, hardware 2030 can be part of a larger cluster of hardware (e.g., such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 2040 can be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 2030 and corresponds to application 2020 in FIG. 20.

In some embodiments, one or more radio units 20200 that each include one or more transmitters 20220 and one or more receivers 20210 can be coupled to one or more antennas 20225. Radio units 20200 can communicate directly with hardware nodes 2030 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 20230, which can alternatively be used for communication between the hardware nodes 2030 and radio units 20200.

Figure 21:
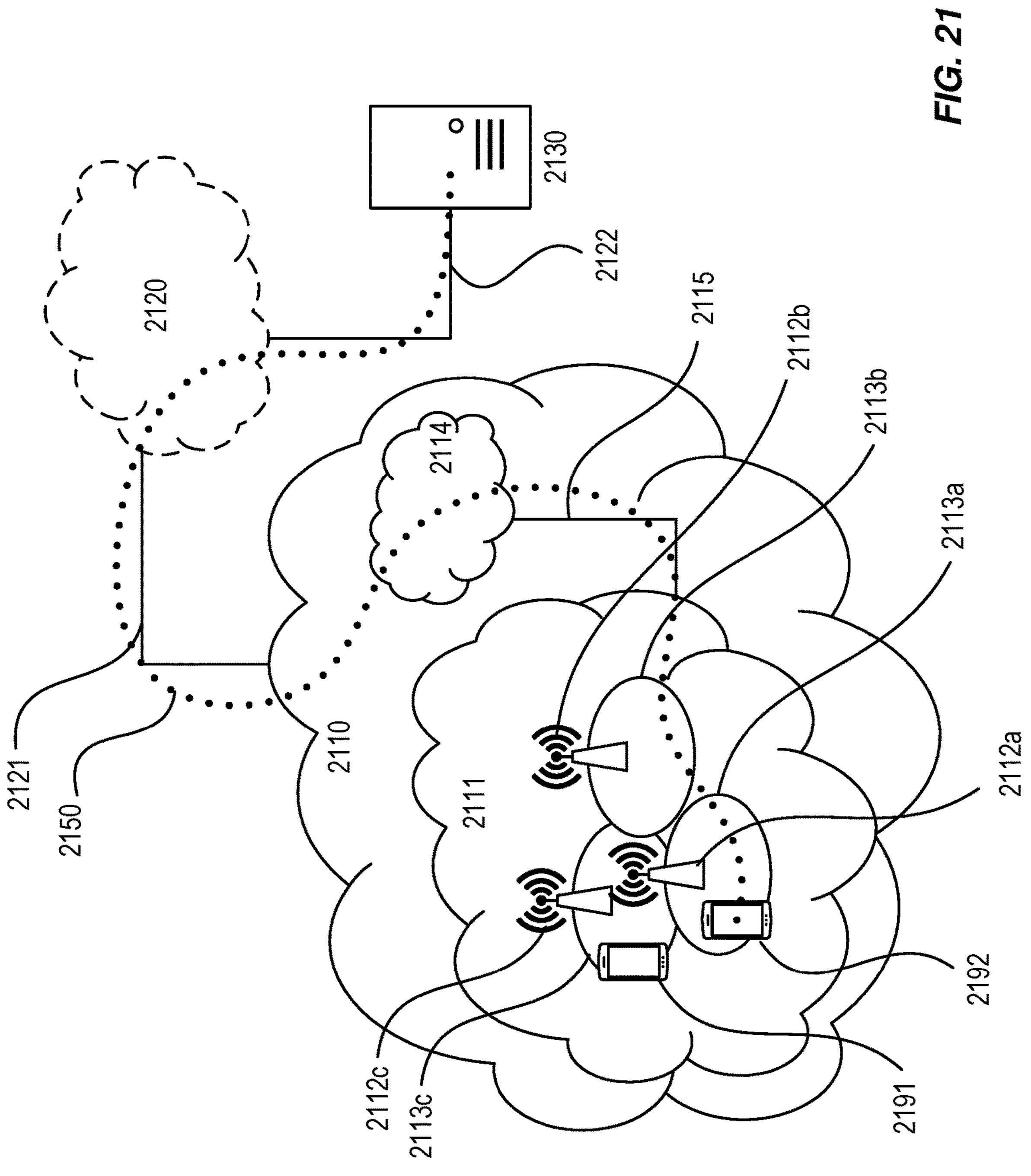
FIGS. 21-22 are block diagrams of various exemplary communication systems and/or networks, in accordance with various aspects described herein.

With reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112*a*, 2112*b*, 2112*c*, such as NBs, eNBs, gNBs or other types of wireless access points, each defining a corresponding coverage area 2113*a*, 2113*b*, 2113*c*. Each base station 2112*a*, 2112*b*, 2112*c* is connectable to core network 2114 over a wired or wireless connection 2115. A first UE 2181 located in coverage area 2113*c* can be configured to wirelessly connect to, or be paged by, the corresponding base station 2112*c*. A second UE 2182 in coverage area 2113*a* is wirelessly connectable to the corresponding base station 2112*a*. While a plurality of UEs 2181, 2182 are illustrated in this example, the disclosed embodiments are equally applicable to a situation where a sole UE is in the coverage area or where a sole UE is connecting to the telecommunication network 2110.

Telecommunication network 2110 is itself connected to host computer 2130, which can be embodied in the hardware and/or software of a standalone server, a cloud-implemented server, a distributed server or as processing resources in a server farm. Host computer 2130 can be under the ownership or control of a service provider or can be operated by or on behalf of the service provider. Connections 2121 and 2122 between telecommunication network 2110 and host computer 2130 can extend directly from core network 2114 to host computer 2130 or can go via an optional intermediate network 2120. Intermediate network 2120 can be one of, or a combination of more than one of, a public, private or hosted network; intermediate network 2120, if any, can be a backbone network or the Internet; in particular, intermediate network 2120 can comprise two or more sub-networks (not shown).

The communication system of FIG. 21 as a whole enables connectivity between the connected UEs 2181, 2182 and host computer 2130. The connectivity can be described as an over-the-top (OTT) connection 2150. Host computer 2130 and the connected UEs 2181, 2182 are configured to communicate data and/or signaling via OTT connection 2150, using access network 2111, core network 2114, any intermediate network 2120 and possible further infrastructure (not shown) as intermediaries. OTT connection 2150 can be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2181. Similarly, base station 2112 need not be aware of the future routing of an outgoing uplink communication originating from the UE 2181 towards the host computer 2130.

Example implementations, in accordance with an embodiment, of the UE, base station and host computer discussed in the preceding paragraphs will now be described with reference to FIG. 22. In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which can have storage and/or processing capabilities. In particular, processing circuitry 2218 can comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 can be operable to provide a service to a remote user, such as UE 2230 connecting via OTT connection 2250 terminating at UE 2230 and host computer 2210. In providing the service to the remote user, host application 2212 can provide user data which is transmitted using OTT connection 2250.

Communication system 2200 can also include base station 2220 provided in a telecommunication system and comprising hardware 2225 enabling it to communicate with host computer 2210 and with UE 2230. Hardware 2225 can include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 can be configured to facilitate connection 2260 to host computer 2210. Connection 2260 can be direct, or it can pass through a core network (not shown in FIG. 22) of the telecommunication system and/or through one or more intermediate networks outside the telecommunication system. In the embodiment shown, hardware 2225 of base station 2220 can also include processing circuitry 2228, which can comprise one or more programmable processors, application-specific integrated circuits, field programmable gate arrays or combinations of these (not shown) adapted to execute instructions.

Base station 2220 also includes software 2221 stored internally or accessible via an external connection. For example, software 2221 can include program instructions (also referred to as a computer program product) that, when executed by processing circuitry 2228, can configure base station 2220 to perform operations corresponding to various exemplary methods (e.g., procedures) described herein.

Communication system 2200 can also include UE 2230 already referred to, whose hardware 2235 can include radio interface 2237 configured to set up and maintain wireless connection 2270 with a base station serving a coverage area in which UE 2230 is currently located. Hardware 2235 of UE 2230 can also include processing circuitry 2238, which can comprise one or more programmable processors, application-specific integrated circuits, field programmable gate arrays or combinations of these (not shown) adapted to execute instructions.

UE 2230 also includes software 2231, which is stored in or accessible by UE 2230 and executable by processing circuitry 2238. Software 2231 includes client application 2232. Client application 2232 can be operable to provide a service to a human or non-human user via UE 2230, with the support of host computer 2210. In host computer 2210, an executing host application 2212 can communicate with the executing client application 2232 via OTT connection 2250 terminating at UE 2230 and host computer 2210. In providing the service to the user, client application 2232 can receive request data from host application 2212 and provide user data in response to the request data. OTT connection 2250 can transfer both the request data and the user data. Client application 2232 can interact with the user to generate the user data that it provides. Software 2231 can also include program instructions (also referred to as a computer program product) that, when executed by processing circuitry 2238, can configure UE 2230 to perform operations corresponding to various exemplary methods (e.g., procedures) described herein.

Figure 22:
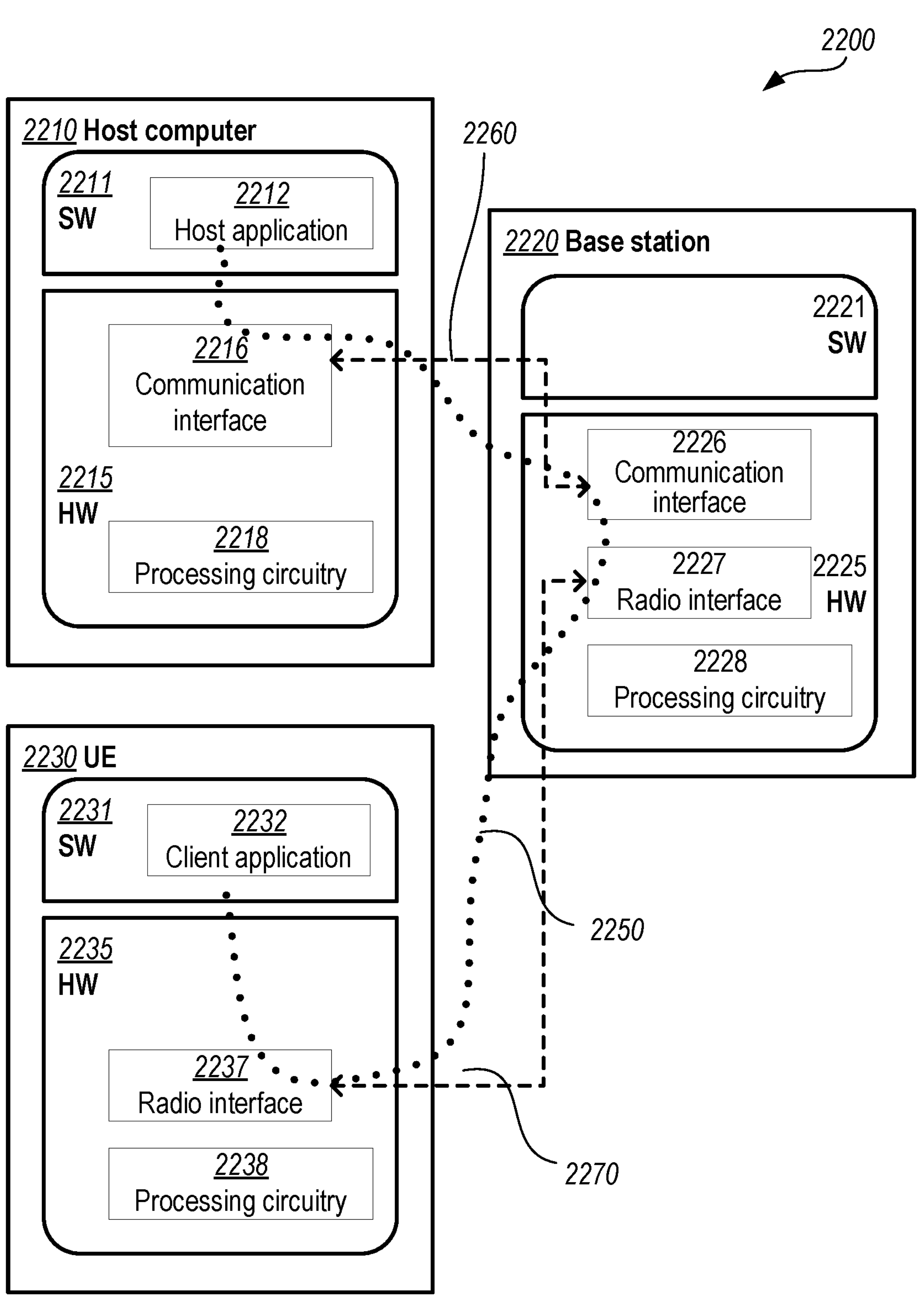

It is noted that host computer 2210, base station 2220 and UE 2230 illustrated in FIG. 22 can be similar or identical to host computer 2130, one of base stations 2112*a*, 2112*b*, 2112*c* and one of UEs 2191, 2192 of FIG. 21, respectively. This is to say, the inner workings of these entities can be as shown in FIG. 22 and independently, the surrounding network topology can be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure can determine the routing, which it can be configured to hide from UE 2230 or from the service provider operating host computer 2210, or both. While OTT connection 2250 is active, the network infrastructure can further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments improve the performance of OTT services provided to UE 2230 using OTT connection 2250, in which wireless connection 2270 forms the last segment. More precisely, the embodiments disclosed herein can improve flexibility for the network to monitor end-to-end quality-of-service (QOS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2250 between host computer 2210 and UE 2230, in response to variations in the measurement results. The measurement procedure and/or the network functionality for reconfiguring OTT connection 2250 can be implemented in software 2211 and hardware 2215 of host computer 2210 or in software 2231 and hardware 2235 of UE 2230, or both. In embodiments, sensors (not shown) can be deployed in or in association with communication devices through which OTT connection 2250 passes; the sensors can participate in the measurement procedure by supplying values of the monitored quantities exemplified above, or supplying values of other physical quantities from which software 2211, 2231 can compute or estimate the monitored quantities. The reconfiguring of OTT connection 2250 can include message format, retransmission settings, preferred routing etc.; the reconfiguring need not affect base station 2220, and it can be unknown or imperceptible to base station 2220. Such procedures and functionalities can be known and practiced in the art. In certain embodiments, measurements can involve proprietary UE signaling facilitating host computer 2210's measurements of throughput, propagation times, latency and the like. The measurements can be implemented in that software 2211 and 2231 causes messages to be transmitted, in particular empty or 'dummy' messages, using OTT connection 2250 while it monitors propagation times, errors, etc.

FIG. 23 is a flowchart illustrating an exemplary method and/or procedure implemented in a communication system, in accordance with one embodiment. The communication system includes a host computer, a base station and a UE which, in some embodiments, can be those described with reference to other figures herein. For simplicity of the present disclosure, only drawing references to FIG. 23 will be included in this section. In step 2310, the host computer provides user data. In substep 2311 (which can be optional) of step 2310, the host computer provides the user data by executing a host application. In step 2320, the host computer initiates a transmission carrying the user data to the UE. In step 2330 (which can be optional), the base station transmits to the UE the user data which was carried in the transmission that the host computer initiated, in accordance with the teachings of the embodiments described throughout this disclosure. In step 2340 (which can also be optional), the UE executes a client application associated with the host application executed by the host computer.

FIG. 24 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission can pass via the base station, in accordance with the teachings of the embodiments described throughout this disclosure. In step 2430 (which can be optional), the UE receives the user data carried in the transmission.

FIG. 25 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 25 will be included in this section. In step 2510 (which can be optional), the UE receives input data provided by the host computer. Additionally or alternatively, in step 2520, the UE provides user data. In substep 2521 (which can be optional) of step 2520, the UE provides the user data by executing a client application. In substep 2511 (which can be optional) of step 2510, the UE executes a client application which provides the user data in reaction to the received input data provided by the host computer. In providing the user data, the executed client application can further consider user input received from the user. Regardless of the specific manner in which the user data was provided, the UE initiates, in substep 2530 (which can be optional), transmission of the user data to the host computer.

In step 2540 of the method, the host computer receives the user data transmitted from the UE, in accordance with the teachings of the embodiments described throughout this disclosure.

FIG. 26 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 26 will be included in this section. In step 2610 (which can be optional), in accordance with the teachings of the embodiments described throughout this disclosure, the base station receives user data from the UE. In step 2620 (which can be optional), the base station initiates transmission of the received user data to the host computer. In step 2630 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

Example embodiments of the techniques and apparatus described herein include, but are not limited to, the following enumerated embodiments:

A1. A method for an integrated access backhaul (IAB) node serving a cell in a wireless network, the IAB node comprising an IAB distributed unit (DU) and an IAB mobile terminal (MT), the method comprising:
- sending, to an IAB donor centralized unit (CU) in the wireless network, an indication of one or more simultaneous operation capabilities of the IAB-DU and the IAB-MT;
- receiving, from the IAB donor CU, a multiplexing configuration based on the simultaneous operation capabilities; and
- configuring one or more of the following for operation in the cell according to the received multiplexing configuration: one or more child IAB nodes, and one or more user equipment (UEs).

A2. The method of embodiment A1, further comprising receiving the following from the IAB donor CU:
- a first configuration of the IAB-MT for operation in a cell served by a parent IAB node; and
- a second configuration of the IAB-DU for serving the cell,
- wherein the indication of the simultaneous operation capabilities is based on the first and second configurations.

A3. the method of embodiment A2, wherein the first configuration includes an indication of one of the following resource types for each timeslot of the link between the IAB-MT and the parent IAB node: uplink-only, downlink-only, flexible uplink-downlink, and not available.

A4. The method of any of embodiments A2-A3, wherein configuring one or more child IAB nodes and/or one or more UEs for operation in the cell is further based on the second configuration.

A5. The method of any of embodiments A1-A4, wherein the simultaneous operation capabilities include any of the following:

time domain multiplexing (TDM) capability;

frequency domain multiplexing (FDM) capability;

spatial domain multiplexing (SDM) capability;

number of concurrent beams supported for SDM;

interference mitigation capabilities;

supported timing modes and/or synchronization procedures;

supported power control dynamic range;

supported power control procedures; and one or more preferred modes for multiplexing between IAB-DU and IAB-MT.

A6. The method of any of embodiments A1-A5, wherein the multiplexing configuration includes indications of one or more of the following for each of a plurality of timeslots:

one or more types of multiplexing between IAB-DU and IAB-MT allowed during the timeslot;

one or more types of traffic allowed during the timeslot; and a type of time resource availability for the IAB-DU during the timeslot.

A7. The method of embodiment A6, wherein indications in the multiplexing configuration include first indications applicable to downlink-only timeslots, second indications application to uplink-only timeslots; and third indications applicable to flexible uplink-downlink timeslots.

A8. The method of any of embodiments A6-A7, wherein the one or more types of multiplexing allowed during each timeslot are:

only one of time domain multiplexing (TDM), frequency domain multiplexing (FDM), or spatial domain multiplexing (SDM); or only TDM or both FDM and SDM.

A9. The method of embodiment A8, wherein when only TDM is indicated as allowed for a timeslot, the multiplexing configuration also includes an indication of one of the following for the timeslot:

the timeslot is always available for the IAB-DU;

the availability of the timeslot for the IAB-DU is controlled by a parent IAB node with respect to the IAB node; or the timeslot is not available for the IAB-DU.

A10. The method of any of embodiments A8-A9, wherein when both FDM and SDM are indicated as allowed for a timeslot, the multiplexing configuration also includes an indication of one of the following for each of a plurality of frequency resources during the timeslot:

the frequency resource is always available during the timeslot for the IAB-DU;

the availability of the frequency resource for the IAB-DU during the timeslot is controlled by a parent IAB node with respect to the IAB node; or the frequency resource is always available for the IAB-DU during the timeslot.

A11. The method of any of embodiments A6-A10, wherein the one or more types of traffic allowed during each timeslot including one or more of the following:

backhaul traffic between the IAB node and either a parent IAB node or a child IAB node; and access traffic between the IAB-MT and UEs.

A12. The method of embodiment A11, wherein:

timeslots during which only one of backhaul traffic and access traffic is allowed are indicated explicitly; and timeslots during which both backhaul traffic and access traffic are allowed are indicated implicitly.

A13. The method of any of embodiments A11-A12, wherein the multiplexing configuration further indicates that one of backhaul traffic and access traffic is allowed in downlink timeslots, and uplink timeslots are reserved for the other of backhaul traffic and access traffic.

A14. The method of any of embodiments A1-A13, further comprising:

in response to a change in operation conditions related to the cell or the IAB-MT, sending, to a parent IAB node, a request for an updated multiplexing configuration in accordance with the change in operation conditions;

receiving, from the parent IAB node, the updated multiplexing configuration or an indication thereof; and configuring one or more of the following for operation in the cell according to the updated multiplexing configuration: the one or more child IAB nodes, and the one or more UEs.

A15. The method of embodiment A15, wherein:

the updated multiplexing configuration is received from the donor CU together with the multiplexing configuration; and the indication of the updated multiplexing configuration is received from the parent IAB node in downlink control information (DCI).

A16. The method of any of embodiments A14-A15, further comprising sending one of the following to the IAB donor CU: the updated multiplexing configuration or an indication that the updated multiplexing configuration is being used.

B1. A method for an integrated access backhaul (IAB) donor centralized unit (CU) configured to communicate with an IAB node in a wireless network, the method comprising:

receiving, from the IAB node, an indication of one or more simultaneous operation capabilities of an IAB distributed unit (DU) and an IAB mobile terminal (MT) of the IAB node;

determining a multiplexing configuration for the IAB node based on the simultaneous operation capabilities; and sending the multiplexing configuration to the IAB node.

B2. The method of embodiment B1, further comprising sending the following to the IAB node:

a first configuration of the IAB-MT for operation in a cell served by a parent IAB node of the IAB node; and a second configuration of the IAB-DU for serving a cell, wherein the indication of the simultaneous operation capabilities is based on the first and second configurations.

B3. The method of embodiment B2, wherein the first configuration includes an indication of one of the following resource types for each timeslot of the link between the IAB-MT and the parent IAB node: uplink-only, downlink-only, flexible uplink-downlink, and not available.

B4. The method of any of embodiments B1-B3, wherein the simultaneous operation capabilities include any of the following:

time domain multiplexing (TDM) capability;

frequency domain multiplexing (FDM) capability;
spatial domain multiplexing (SDM) capability;
number of concurrent beams supported for SDM;
interference mitigation capabilities;
supported timing modes and/or synchronization procedures;
supported power control dynamic range;
supported power control procedures; and
one or more preferred modes for multiplexing between IAB-DU and IAB-MT.

B5. The method of any of embodiments B11-B4, wherein the multiplexing configuration includes indications of one or more of the following for each of a plurality of timeslots:
one or more types of multiplexing between IAB-DU and IAB-MT allowed during the timeslot;
one or more types of traffic allowed during the timeslot; and
a type of time resource availability for the IAB-DU during the timeslot.

B6. The method of embodiment B5, wherein indications in the multiplexing configuration include first indications applicable to downlink-only timeslots, second indications application to uplink-only timeslots; and third indications applicable to flexible uplink-downlink timeslots.

B7. The method of any of embodiments B5-B6, wherein the one or more types of multiplexing allowed during each timeslot are:
only one of time domain multiplexing (TDM), frequency domain multiplexing (FDM), or spatial domain multiplexing (SDM); or
only TDM or both FDM and SDM.

B8. The method of embodiment B7, wherein when only TDM is indicated as allowed for a timeslot, the multiplexing configuration also includes an indication of one of the following for the timeslot:
the timeslot is always available for the IAB-DU;
the availability of the timeslot for the IAB-DU is controlled by a parent IAB node with respect to the IAB node; or
the timeslot is not available for the IAB-DU.

B9. The method of any of embodiments B7-B8, wherein when both FDM and SDM are indicated as allowed for a timeslot, the multiplexing configuration also includes an indication of one of the following for each of a plurality of frequency resources during the timeslot:
the frequency resource is always available during the timeslot for the IAB-DU;
the availability of the frequency resource for the IAB-DU during the timeslot is controlled by a parent IAB node with respect to the IAB node; or
the frequency resource is always available for the IAB-DU during the timeslot.

B10. The method of any of embodiments B5-B9, wherein the one or more types of traffic allowed during each timeslot including one or more of the following:
backhaul traffic between the IAB node and either a parent IAB node or a child IAB node; and
access traffic between the IAB node and UEs.

B11. The method of embodiment B10, wherein:
timeslots during which only one of backhaul traffic and access traffic is allowed are indicated explicitly; and
timeslots during which both backhaul traffic and access traffic are allowed are indicated implicitly.

B12. The method of any of embodiments B10-B11, wherein the multiplexing configuration further indicates that one of backhaul traffic and access traffic is allowed in downlink timeslots, and uplink timeslots are reserved for the other of backhaul traffic and access traffic.

B13. The method of any of embodiments B1-B12, wherein determining the multiplexing configuration for the IAB node is further based on one or more of the following:
radio resource management (RRM) or radio link monitoring (RLM) configurations associated with the IAB node, a parent IAB node of the IAB node, and/or one or more child IAB nodes of the IAB nodes; and
RRM or RLM measurements received from the IAB node, the parent IAB node, and/or the one or more child IAB nodes.

B14. The method of any of embodiments B1-B13, further comprising receiving, from the IAB node, an updated multiplexing configuration currently being used by the IAB node or an indication thereof.

B15. The method of embodiment B14, wherein:
the updated multiplexing configuration is sent to the IAB node together with the multiplexing configuration; and
the indication of the updated multiplexing configuration is received from the IAB node.

B16. The method of any of embodiments B1-B15, further comprising sending the multiplexing configuration to a parent IAB node of the IAB node.

C1. A method for a parent integrated access backhaul (IAB) node of an IAB node in a wireless network, the method comprising:
receiving, from an IAB donor centralized unit (CU) in the wireless network, a multiplexing configuration for the IAB node based on simultaneous operation capabilities of the IAB node;
configuring the IAB node to operate in a cell served by the parent IAB node in accordance with the multiplexing configuration;
receiving, from the IAB node, a request for an updated multiplexing configuration based on a change in operation conditions at the IAB node;
determining an updated multiplexing configuration for the IAB node; and
sending, to the IAB node, the updated multiplexing configuration or an indication thereof.

C2. The method of embodiment C1, wherein:
the updated multiplexing configuration is received from the IAB donor CU together with the multiplexing configuration; and
the indication of the updated multiplexing configuration is sent to the IAB node in downlink control information (DCI).

C3. The method of any of embodiments C1-C2, wherein:
the parent IAB node includes a parent IAB distributed unit (DU);
the method further comprises receiving a configuration of the parent IAB-DU from the IAB donor CU; and
configuring the IAB node to operate in the cell is further based on the received configuration of the parent IAB-DU.

C4. The method of any of embodiments C1-C3, wherein:
the IAB node includes an IAB distributed unit (DU) and an IAB mobile terminal (MT); and
the multiplexing configuration includes indications of one or more of the following for each of a plurality of timeslots:

one or more types of multiplexing between IAB-DU and IAB-MT allowed during the timeslot;

one or more types of traffic allowed during the timeslot; and a type of time resource availability for the IAB-DU during the timeslot.

C5. The method of embodiment C4, wherein indications in the multiplexing configuration include first indications applicable to downlink-only timeslots, second indications application to uplink-only timeslots; and third indications applicable to flexible uplink-downlink timeslots.

C6. The method of any of embodiments C4-C5, wherein the one or more types of multiplexing allowed during each timeslot are:

only one of time domain multiplexing (TDM), frequency domain multiplexing (FDM), or spatial domain multiplexing (SDM); or only TDM or both FDM and SDM.

C7. The method of embodiment C6, wherein when only TDM is indicated as allowed for a timeslot, the multiplexing configuration also includes an indication of one of the following for the timeslot:

the timeslot is always available for the IAB-DU;

the availability of the timeslot for the IAB-DU is controlled by a parent IAB node with respect to the IAB node; or the timeslot is not available for the IAB-DU.

C8. The method of any of embodiments C6-C7, wherein when both FDM and SDM are indicated as allowed for a timeslot, the multiplexing configuration also includes an indication of one of the following for each of a plurality of frequency resources during the timeslot:

the frequency resource is always available during the timeslot for the IAB-DU;

the availability of the frequency resource for the IAB-DU during the timeslot is controlled by a parent IAB node with respect to the IAB node; or the frequency resource is always available for the IAB-DU during the timeslot.

C9. The method of any of embodiments C4-C8, wherein the one or more types of traffic allowed during each timeslot including one or more of the following:

backhaul traffic between the IAB node and either the parent IAB node or a child IAB node of the IAB node; and access traffic between the IAB node and UEs.

C10. The method of embodiment C9, wherein:

timeslots during which only one of backhaul traffic and access traffic is allowed are indicated explicitly; and timeslots during which both backhaul traffic and access traffic are allowed are indicated implicitly.

C11. The method of any of embodiments C9-C10, wherein the multiplexing configuration further indicates that one of backhaul traffic and access traffic is allowed in downlink timeslots, and uplink timeslots are reserved for the other of backhaul traffic and access traffic.

D1. An integrated access backhaul (IAB) node configured to serve a cell in a wireless network, the IAB node comprising:

radio interface circuitry and processing circuitry configured as an IAB mobile terminal (MT) and an IAB distributed unit (DU), wherein the processing circuitry and radio interface circuitry are further configured to perform operations corresponding to any of the methods of embodiments A1-A16.

D2. An integrated access backhaul (IAB) node configured to serve a cell in a wireless network, the IAB node comprising an IAB mobile terminal (MT) and an IAB distributed unit (DU) arranged to perform operations corresponding to any of the methods of embodiments A1-A16.

D3. A non-transitory, computer-readable medium storing computer-executable instructions that, when executed by processing circuitry of an integrated access backhaul (IAB) node configured to serve a cell in a wireless network, configure the IAB node to perform operations corresponding to any of the methods of embodiments A1-A16.

D4. A computer program product comprising computer-executable instructions that, when executed by processing circuitry of an integrated access backhaul (IAB) node configured to serve a cell in a wireless network, configure the IAB node to perform operations corresponding to any of the methods of embodiments A1-A16.

E1. An integrated access backhaul (IAB) donor centralized unit (CU) configured to communicate with an IAB node in a wireless network, the IAB donor CU comprising:

communication interface circuitry configured to communicate with at least the IAB node; and processing circuitry operably coupled to the communication interface circuitry, whereby the processing circuitry and the communication interface circuitry are configured to perform operations corresponding to any of the methods of embodiments B1-B16.

E2. An integrated access backhaul (IAB) donor centralized unit (CU) configured to communicate with an IAB node in a wireless network, the IAB donor CU being further configured to perform operations corresponding to any of the methods of embodiments B1-B16.

E3. A non-transitory, computer-readable medium storing computer-executable instructions that, when executed by processing circuitry of an integrated access backhaul (IAB) donor centralized unit (CU) configured to communicate with an IAB node in a wireless network, configure the IAB donor CU to perform operations corresponding to any of the methods of embodiments B1-B16.

E4. A computer program product comprising computer-executable instructions that, when executed by processing circuitry of an integrated access backhaul (IAB) donor centralized unit (CU) configured to communicate with an IAB node in a wireless network, configure the IAB donor CU to perform operations corresponding to any of the methods of embodiments B1-B16.

F1. A parent integrated access backhaul (IAB) node of an IAB node in a wireless network, the parent IAB node comprising:

radio interface circuitry and processing circuitry configured as at least a parent IAB distributed unit (DU), wherein the processing circuitry and radio interface circuitry are further configured to perform operations corresponding to any of the methods of embodiments C1-C10.

F2. A parent integrated access backhaul (IAB) node of an IAB node in a wireless network, the parent IAB node comprising an IAB distributed unit (DU) and being configured to perform operations corresponding to any of the methods of embodiments C1-C10.

F3. A non-transitory, computer-readable medium storing computer-executable instructions that, when executed by processing circuitry of a parent integrated access backhaul (IAB) node of an IAB node in a wireless network, configure the parent IAB node to perform operations corresponding to any of the methods of embodiments C1-C10.

F4. A computer program product comprising computer-executable instructions that, when executed by processing circuitry of a parent integrated access backhaul (IAB) node of an IAB node in a wireless network, configure the parent IAB node to perform operations corresponding to any of the methods of embodiments C1-C10.

The invention claimed is:

1. A method for an integrated access backhaul (IAB) node configured to operate in a wireless network, the IAB node comprising an IAB distributed unit (IAB-DU) and an IAB mobile terminal (IAB-MT), the method comprising:
- receiving the following from an IAB donor centralized unit (CU) in the wireless network:
  - a first configuration of the IAB-MT for operation in a first cell served by a parent IAB node of the IAB node; and
  - a second configuration of the IAB-DU for serving a second cell;
- sending, to the IAB donor CU, an indication of one or more capability for simultaneous operation of the IAB-DU and the IAB-MT, in accordance with the received first and second configurations;
- receiving, from the IAB donor CU, a multiplexing configuration for each timeslot based on the indicated one or more capability; and
- configuring one or more of the following for operation in the second cell according to the received multiplexing configuration: one or more child IAB nodes; and one or more user equipment (UEs).

2. The method of claim 1, wherein one or more of the following applies:
- the first configuration includes an indication of one of the following resource types for each timeslot of the link between the IAB-MT and the parent IAB node: uplink-only, downlink-only, flexible uplink-downlink, and not available; and
- the second configuration includes an indication of one of the following frequency-domain resource configurations for the second cell: Hard (H), Soft (S), and Not Available (NA).

3. The method of claim 2, wherein the second configuration also includes a time-domain resource configuration for the second cell.

4. The method of claim 1, wherein configuring for operation in the second cell is further based on the second configuration.

5. The method of claim 1, further comprising transmitting, to the parent IAB node, an indication of the second configuration of the IAB-DU for serving the second cell.

6. The method of claim 5, further comprising:
- in response to a change in operation conditions related to the second cell or the IAB-MT, sending to the parent IAB node a request to update the multiplexing configuration in accordance with the change in operation conditions;
- receiving from the parent IAB node an updated multiplexing configuration or an indication to use a previously received updated multiplexing configuration; and
- configuring one or more of the following for operation in the second cell according to the updated multiplexing configuration indicated by the parent IAB node: the one or more child IAB nodes, and the one or more UEs.

7. The method of claim 6, wherein:
- the updated multiplexing configuration is received from the IAB donor CU together with the multiplexing configuration; and
- the indication to use the updated multiplexing configuration is received from the parent IAB node.

8. The method of claim 6, further comprising sending one of the following to the IAB donor CU: the updated multiplexing configuration or an indication that the updated multiplexing configuration is being used.

9. The method of claim 1, wherein the indicated one or more capability includes any of the following:
- time domain multiplexing (TDM) capability;
- frequency domain multiplexing (FDM) capability;
- spatial domain multiplexing (SDM) capability;
- supported timing modes;
- supported synchronization procedures;
- supported power control dynamic range;
- power control configurations supported for simultaneous operation; and
- one or more preferred modes for multiplexing between IAB-DU and IAB-MT.

10. The method of claim 1, wherein the multiplexing configuration includes indications of one or more of the following for each of a plurality of timeslots:
- one or more types of multiplexing between IAB-DU and IAB-MT allowed during the timeslot, including one or more of the following:
  - IAB-MT Transmission (TX)/IAB-DU TX;
  - IAB-MT TX/IAB-DU Reception (RX);
  - IAB-MT RX/IAB-DU TX; and
  - IAB-MT RX/IAB-DU RX;
- one or more types of traffic allowed during the timeslot, including one or more of the following types: access traffic, and backhaul traffic; and
- a type of time resource available for the IAB-DU during the timeslot, the type of time resource being one of the following: a downlink time resource, an uplink time resource, and a flexible uplink-downlink time resource.

11. The method of claim 10, wherein time domain multiplexing (TDM) or frequency domain multiplexing (FDM) is allowed during each of the timeslots.

12. The method of claim 11, wherein for each of the timeslots:
- when TDM is indicated as allowed for the timeslot, the multiplexing configuration also includes an indication of one of the following for the timeslot:
  - the timeslot is always available for the IAB-DU,
  - the availability of the timeslot for the IAB-DU is controlled by the parent IAB node, or
  - the timeslot is not available for the IAB-DU; and
- when FDM is indicated as allowed for the timeslot, the multiplexing configuration also includes an indication of one of the following for each of a plurality of frequency resources during the timeslot:
  - the frequency resource is always available during the timeslot for the IAB-DU,
  - the availability of the frequency resource for the IAB-DU during the timeslot is controlled by the parent IAB node, or the frequency resource is not available for the IAB-DU during the timeslot.

13. A non-transitory, computer-readable medium storing computer-executable instructions the execution of which causes the method of claim 1 to be performed by the IAB node.

14. A method for an integrated access backhaul (IAB) donor centralized unit (CU) configured to operate in a wireless network, the method comprising:

sending the following to an IAB node that comprises an IAB distributed unit (IAB-DU) and an IAB mobile terminal (IAB-MT):

a first configuration of the IAB-MT for operation in a first cell served by a parent IAB node of the IAB node; and a second configuration of the IAB-DU for serving a second cell;

receiving, from the IAB node, an indication of one or more capability for simultaneous operation of the IAB-DU and the IAB-MT, in accordance with the first and second configurations;

determining a multiplexing configuration for each timeslot for the IAB node based on the indicated one or more capability; and sending the multiplexing configuration to the IAB node.

15. The method of claim 14, further comprising receiving one of the following from the IAB node: an updated multiplexing configuration being used by the IAB node, or an indication that a previously received updated multiplexing configuration is being used by the IAB node.

16. The method of claim 15, wherein the indication is received from the IAB node and pertains to an updated multiplexing configuration sent to the IAB node together with the multiplexing configuration.

17. The method of claim 14, wherein determining the multiplexing configuration for the IAB node is further based on one or more of the following:

radio resource management (RRM) or radio link monitoring (RLM) configurations associated with one or more of the following: the IAB node, the parent IAB node, and one or more child IAB nodes of the IAB node; and RRM or RLM measurements received from one or more of the following: the IAB node, the parent IAB node, and the one or more child IAB nodes.

18. The method of claim 14, further comprising sending the multiplexing configuration to the parent IAB node.

19. A non-transitory, computer-readable medium storing computer-executable instructions, the execution of which causes the method of claim 14 to be performed by the IAB donor CU.

20. An integrated access backhaul (IAB) node configured to operate in a wireless network, the IAB node comprising:

processing circuitry and communication interface circuitry configured as an IAB mobile terminal (IAB-MT) and an IAB distributed unit (IAB-DU), wherein the processing circuitry and the communication interface circuitry are further configured to:

receive the following from an IAB donor centralized unit (CU) in the wireless network:

a first configuration of the IAB-MT for operation in a first cell served by a parent IAB node of the IAB node; and a second configuration of the IAB-DU for serving a second cell;

send, to the IAB donor CU, an indication of one or more capability for simultaneous operation of the IAB-DU and the IAB-MT, in accordance with the received first and second configurations;

receive, from the IAB donor CU, a multiplexing configuration for each timeslot based on the indicated one or more capability; and configure one or more of the following for operation in the second cell according to the received multiplexing configuration: one or more child IAB nodes; and one or more user equipment (UEs).

21. An integrated access backhaul (IAB) donor centralized unit (CU) configured to operate in a wireless network, the IAB donor CU comprising communication interface circuitry and processing circuitry that are operably coupled and are configured to:

send the following to an IAB node that comprises an IAB distributed unit (IAB-DU) and an IAB mobile terminal (IAB-MT):

a first configuration of the IAB-MT for operation in a first cell served by a parent IAB node of the IAB node; and a second configuration of the IAB-DU for serving a second cell;

receive, from the IAB node, an indication of one or more capability for simultaneous operation of the IAB-DU and the IAB-MT, in accordance with the first and second configurations;

determine a multiplexing configuration for each timeslot for the IAB node based on the indicated one or more capability; and send the multiplexing configuration to the IAB node.

22. The IAB donor CU of claim 21, wherein the processing circuitry and the communication interface circuitry are further configured to receive one of the following from the IAB node: an updated multiplexing configuration being used by the IAB node, or an indication that a previously received updated multiplexing configuration is being used by the IAB node.

* * * * *